United States Patent
Amos et al.

(10) Patent No.: US 9,815,969 B2
(45) Date of Patent: *Nov. 14, 2017

(54) COMPOSITE PARTICLES INCLUDING A FLUOROPOLYMER, METHODS OF MAKING, AND ARTICLES INCLUDING THE SAME

(71) Applicant: 3M INNOVATIVE PROPERTIES COMPANY, St. Paul, MN (US)

(72) Inventors: Stephen E. Amos, Minneapolis, MN (US); Carlos A. Barrios, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 149 days.

This patent is subject to a terminal disclaimer.

(21) Appl. No.: 14/654,137

(22) PCT Filed: Dec. 20, 2013

(86) PCT No.: PCT/US2013/076981
§ 371 (c)(1),
(2) Date: Jun. 19, 2015

(87) PCT Pub. No.: WO2014/100614
PCT Pub. Date: Jun. 26, 2014

(65) Prior Publication Data
US 2015/0315071 A1    Nov. 5, 2015

(51) Int. Cl.
*C08K 7/28*     (2006.01)
*C08L 23/06*    (2006.01)
(Continued)

(52) U.S. Cl.
CPC ............. *C08K 7/28* (2013.01); *C03C 11/002* (2013.01); *C03C 17/328* (2013.01); *C08J 5/02* (2013.01);
(Continued)

(58) Field of Classification Search
CPC .... C08K 7/28; C08K 9/08; C08K 9/10; C08L 23/06; C08L 23/12; C08L 83/04;
(Continued)

(56) References Cited

U.S. PATENT DOCUMENTS 2,559,752 A    7/1951   Berry
2,978,340 A    4/1961   Veatch
(Continued)

FOREIGN PATENT DOCUMENTS

CN    102311530    1/2012
JP    S59207855    11/1984
(Continued)

OTHER PUBLICATIONS

3M™ Glass Microsphere Compounding and Injection Molding Guidelines. 2008, 1-8 pages.
(Continued)

*Primary Examiner* — Michael C Miggins

(57) ABSTRACT

A composite particle includes a discrete, hollow, ceramic spheroid and a fluoropolymer layer disposed thereon. The fluoropolymer is an amorphous homopolymer or copolymer of a perfluoroalkyl vinyl ether; a perfluoroalkoxy vinyl ether; at least one fTuorookfe independently represented by formula $C(R)_2=CF-Rf$; wherein Rf is fluorine or a perfluoroalkyl having from 1 to 8 carbon atoms and R is hydrogen, fluorine, or chlorine; or a combination thereof. Methods of making the composite particles, composite materials, and articles including them are also disclosed.

20 Claims, 2 Drawing Sheets

(51) Int. Cl.
| | |
|---|---|
| C08L 23/12 | (2006.01) |
| C08L 83/04 | (2006.01) |
| C08L 63/00 | (2006.01) |
| C08L 61/06 | (2006.01) |
| C08L 25/06 | (2006.01) |
| F16L 58/10 | (2006.01) |
| C09D 127/20 | (2006.01) |
| C08J 5/02 | (2006.01) |
| C09D 127/16 | (2006.01) |
| C09D 123/12 | (2006.01) |
| C03C 11/00 | (2006.01) |
| C03C 17/32 | (2006.01) |
| F16L 59/14 | (2006.01) |
| C08K 9/08 | (2006.01) |
| C08K 9/10 | (2006.01) |
| C09C 3/10 | (2006.01) |
| C09C 1/28 | (2006.01) |

(52) U.S. Cl.
CPC .......... C08K 9/08 (2013.01); C08K 9/10 (2013.01); C08L 23/06 (2013.01); C08L 23/12 (2013.01); C08L 25/06 (2013.01); C08L 61/06 (2013.01); C08L 63/00 (2013.01); C08L 83/04 (2013.01); C09D 123/12 (2013.01); C09D 127/16 (2013.01); C09D 127/20 (2013.01); F16L 58/1054 (2013.01); F16L 59/143 (2013.01); C01P 2004/02 (2013.01); C01P 2004/34 (2013.01); C01P 2004/61 (2013.01); C01P 2006/10 (2013.01); C08J 2327/16 (2013.01); C08J 2327/20 (2013.01); C09C 1/28 (2013.01); C09C 3/10 (2013.01); Y10T 428/1321 (2015.01); Y10T 428/2993 (2015.01); Y10T 428/2996 (2015.01); Y10T 428/2998 (2015.01)

(58) Field of Classification Search
CPC .......... C08L 63/00; C08L 61/06; C08L 25/06; F16L 58/1054; F16L 59/143; C09D 127/16; C09D 123/12; C09D 127/20; C08J 5/02; C08J 2327/20; C08J 2327/16; Y10T 428/2996; Y10T 428/2998; Y10T 428/1321; Y10T 428/2993; C03C 11/002; C03C 17/328; C09C 3/10; C09C 1/28; C01P 2004/02; C01P 2004/34; C01P 2004/61; C01P 2006/10
See application file for complete search history.

(56) References Cited

U.S. PATENT DOCUMENTS

| | | | |
|---|---|---|---|
| 3,030,215 | A | 4/1962 | Veatch |
| 3,129,086 | A | 4/1964 | Veatch |
| 3,230,064 | A | 1/1966 | Veatch |
| 3,365,315 | A | 1/1968 | Beck |
| 4,187,332 | A | 2/1980 | Fouche, Jr. |
| 4,391,646 | A | 7/1983 | Howell |
| 4,391,930 | A | 7/1983 | Olson |
| 4,621,116 | A | 11/1986 | Morgan |
| 4,767,726 | A | 8/1988 | Marshall |
| 5,032,627 | A | 7/1991 | Wilson |
| 5,194,459 | A | 3/1993 | Sato |
| 5,285,002 | A | 2/1994 | Grootaert |
| 5,378,782 | A | 1/1995 | Grootaert |
| 5,442,097 | A | 8/1995 | Obermeier |
| 5,922,453 | A | 7/1999 | Horn, III |
| 6,429,258 | B1 | 8/2002 | Morgan |
| 6,500,526 | B1 | 12/2002 | Hannington |
| 6,613,941 | B1 | 9/2003 | Felix |
| 6,706,193 | B1 | 3/2004 | Burkard |
| 6,794,550 | B2 | 9/2004 | Hintzer |
| 7,018,541 | B2 | 3/2006 | Hintzer |
| 7,491,356 | B2 | 2/2009 | Heikkila |
| 7,977,438 | B2 | 7/2011 | Brothers |
| 8,039,073 | B2 | 10/2011 | Lahijani |
| 9,006,302 | B2 | 4/2015 | Amos |
| 9,249,283 | B2 | 2/2016 | Heikkila |
| 9,321,906 | B2 | 4/2016 | Takeishi |
| 9,490,041 | B2 | 11/2016 | Barrios |
| 2003/0091794 | A1 | 5/2003 | Jing et al. |
| 2006/0122049 | A1 | 6/2006 | Marshall |
| 2006/0199898 | A1 | 9/2006 | Funaki |
| 2006/0223924 | A1 | 10/2006 | Tsuda |
| 2006/0281946 | A1 | 12/2006 | Morita |
| 2007/0015864 | A1 | 1/2007 | Hintzer |
| 2007/0015865 | A1 | 1/2007 | Hintzer |
| 2007/0060699 | A1 | 3/2007 | Tsuda |
| 2007/0116942 | A1 | 5/2007 | D'Souza |
| 2007/0117915 | A1 | 5/2007 | Funaki |
| 2007/0142513 | A1 | 6/2007 | Tsuda |
| 2007/0142541 | A1 | 6/2007 | Hintzer |
| 2008/0118741 | A1 | 5/2008 | Michalczyk |
| 2009/0159146 | A1 | 6/2009 | Jackson |
| 2010/0280145 | A1 | 11/2010 | Heikkila |
| 2011/0014476 | A1 | 1/2011 | Guy et al. |
| 2011/0027592 | A1 | 2/2011 | Molnar |
| 2011/0265408 | A1 | 11/2011 | Jha |
| 2011/0306716 | A1 | 12/2011 | Harvey |
| 2012/0264884 | A1 | 10/2012 | Liu |
| 2012/0296029 | A1 | 11/2012 | Liu |
| 2013/0012643 | A1 | 1/2013 | Monsheimer |
| 2015/0344676 | A1 | 12/2015 | Amos |

FOREIGN PATENT DOCUMENTS

| | | |
|---|---|---|
| JP | 1-223151 | 9/1989 |
| JP | 5-139783 | 6/1993 |
| JP | 6-254380 | 9/1994 |
| JP | 7-88354 | 4/1995 |
| WO | WO 2009-080713 | 7/2009 |
| WO | WO 2012-061241 | 5/2012 |
| WO | WO 2013-096157 | 6/2013 |

OTHER PUBLICATIONS

Li J.W. et al. "Morphology, Structure, and Crystallization of LaCl Modified Hollow Glass Microspheres/Poly(vinylidenefluoride) Composites", Journal of Macromolecular Science, Part B: Physics, 2012, vol. 51, pp. 2438-2448.
Malik, "Anti-Corrosion Ability of Surfactants: A Review", International Journal of Electrochemical Science, 2011, vol. 6, pp. 1927-1948.
International Search Report for PCT International Application No. PCT/US2013/076981 dated May 21, 2014, 3 Pages.

COMPOSITE PARTICLES INCLUDING A FLUOROPOLYMER, METHODS OF MAKING, AND ARTICLES INCLUDING THE SAME

CROSS REFERENCE TO RELATED APPLICATION

This application is a national stage filing under 35 U.S.C. 371 of PCT/US2013/076981, filed Dec. 20, 2013, which claims priority to U.S. Provisional Application No. 61/740,080, filed Dec. 20, 2012, the disclosure of which is incorporated by reference in its entirety herein.

BACKGROUND

Ceramic bubbles such as glass bubbles, which are also commonly known as "glass microbubbles", "hollow glass microspheres", "hollow glass beads", or "glass balloons", are widely used in industry, for example, as additives to polymeric compositions. In many industries, glass bubbles are useful, for example, for lowering weight and improving processing, dimensional stability, and flow properties of a polymeric composition. Generally, it is desirable that the glass bubbles be strong enough to avoid being crushed or broken during processing of the particular polymeric compound.

One application for such bubbles is syntactic foams. Syntactic foams containing ceramic bubbles (e.g., glass bubbles) are useful for insulation in a variety of applications due in part to their low thermal conductivity. For example, syntactic foams are used in wet insulation applications (i.e., insulation that is exposed to sea water) for off-shore oil pipelines or flowlines.

SUMMARY

The present disclosure provides a composite particle that includes a discrete, hollow, ceramic spheroid with a layer of fluoropolymer on the outer surface. In many embodiments, the fluoropolymer layer imparts greater resistance to breakage, for example, when mixing the composite particles with a matrix material, imparts hydrophobicity, and imparts resistance to degradation by seawater to the composite particles and to composite materials including the composite particles. These properties make the composite particles particularly useful in syntactic foams, for example, used in wet insulation applications.

In one aspect, the present disclosure provides a composite particle comprising a discrete, hollow, ceramic spheroid and a layer of amorphous fluoropolymer on the discrete, hollow, ceramic spheroid. The amorphous fluoropolymer is an amorphous homopolymer or copolymer of a perfluoroalkyl vinyl ether; a perfluoroalkoxyalkyl vinyl ether; at least one fluoroolefin independently represented by formula $C(R)_2=CF-Rf$, wherein Rf is fluorine or a perfluoroalkyl having from 1 to 8 carbon atoms and R is hydrogen, fluorine, or chlorine; or a combination thereof.

In another aspect, the present disclosure provides a plurality of such composite particles.

In another aspect, the present disclosure provides a composite material comprising a plurality of the composite particles disclosed herein dispersed in a matrix material.

In another aspect, the present disclosure provides a conduit having a layer of the composite material disclosed herein disposed on an outer surface thereof.

In another aspect, the present disclosure provides a method of making composite particles. The method includes providing a dispersion comprising a continuous aqueous phase and a dispersed phase comprising a amorphous fluoropolymer; combining the dispersion with a plurality of hollow, ceramic spheroids such that a layer of amorphous fluoropolymer is disposed on at least a portion of each hollow, ceramic spheroid to form the composite particles, wherein each one of the composite particles contains a discrete, hollow, ceramic spheroid; and separating the composite particles from the continuous aqueous phase.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The following definitions are used herein.

The term "aqueous" means containing at least 5 weight percent of water.

The term "ceramic" refers to glasses, crystalline ceramics, glass-ceramics, and combinations thereof.

The term "microbubble" refers to a hollow spheroidal or spherical particle having a maximum dimension of less than one millimeter.

The term "microsphere" refers to a spherical or ellipsoidal particle having a maximum dimension of less than one millimeter.

The term "monomer" refers to a substance composed of monomer molecules.

The term "monomer molecule" refers to a molecule which can undergo polymerization thereby contributing constitutional units to the essential structure of a macromolecule.

The term "non-polymeric" in reference to a compound means that the compound is not a polymer.

The term "polymer" refers to a macromolecule having at least 10 sequential monomer units (or a substance composed of such macromolecules).

The term "spheroid" refers to an object of approximately spherical shape.

The term "spheroidal" means approximately spherical in shape.

The term "surfactant" refers to an organic surface active compound that lowers the surface tension of a liquid, lowers the interfacial tension between two liquids or between a liquid and a solid. Surfactants generally possess a hydrophilic (polar) moiety and a lipophilic (nonpolar) moiety. Soaps and emulsifiers are included within the term surfactant.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility, but may be swellable in the presence of an appropriate solvent.

The above summary of the present disclosure is not intended to describe each disclosed embodiment or every implementation of the present disclosure. The description that follows more particularly exemplifies illustrative embodiments. It is to be understood, therefore, that the drawings and following description are for illustration purposes only and should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings, in which.

While the above-identified drawing figures set forth several embodiments of the present disclosure, other embodiments are also contemplated; for example, as noted in the discussion. In all cases, the disclosure is presented by way of representation and not limitation. It should be understood that numerous other modifications and embodiments can be devised by those skilled in the art, which fall within the scope and spirit of the principles of the disclosure. The figures may not be drawn to scale.

DETAILED DESCRIPTION

Figure 1:
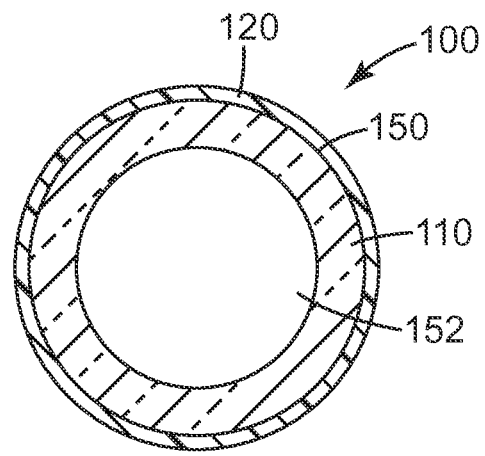
FIG. 1 is a cross-sectional view of an embodiment of a composite particle according to the present disclosure.

Referring now to FIG. 1, composite particle 100 comprises a discrete, ceramic spheroid 110 and a layer 120 of amorphous fluoropolymer disposed on the discrete, ceramic spheroid 110. Discrete, ceramic spheroid 110 has an outer wall 150 that encloses a hollow interior 152.

The spheroid in the composite particle disclosed herein is typically spherical or mildly ellipsoidal in shape, although minor irregularities in the shape, e.g., as resulting from their manufacturing process are acceptable. The spheroid may have one of a variety of useful sizes but typically has a maximum dimension, or average diameter, of less than 10 millimeters (mm), more typically less than one mm. In some embodiments, the spheroid has a maximum dimension in a range from 0.1 micrometer to one mm, from one micrometer to 500 micrometers, from one micrometer to 300 micrometers, or even from one micrometer to 100 micrometers. The mean particle size of the hollow, ceramic spheroids may be, for example, in a range from 5 to 250 micrometers (in some embodiments from 10 to 110 micrometers, from 10 to 70 micrometers, or even from 20 to 40 micrometers). As used herein, the term size is considered to be equivalent with the diameter and height of the hollow ceramic spheroid. For the purposes of the present disclosure, the median size by volume is determined by laser light diffraction by dispersing the hollow, ceramic spheroids in deaerated, deionized water. Laser light diffraction particle size analyzers are available, for example, under the trade designation "SATURN DIGI-SIZER" from Micromeritics. The size distribution of the hollow, ceramic spheroids useful for practicing the present disclosure may be Gaussian, normal, or non-normal. Non-normal distributions may be unimodal or multi-modal (e.g., bimodal).

In some embodiments, the discrete, hollow, ceramic spheroid in the composite particle disclosed herein is a glass bubble (e.g., a glass microbubble, which has a maximum dimension of up to one mm). A variety of glass may be useful (e.g., soda lime glass, borosilicate glass). Glass bubbles useful for composite particles disclosed herein can be made by techniques known in the art (see, e.g., U.S. Pat. No. 2,978,340 (Veatch et al.); U.S. Pat. No. 3,030,215 (Veatch et al.); U.S. Pat. No. 3,129,086 (Veatch et al.); and U.S. Pat. No. 3,230,064 (Veatch et al.); U.S. Pat. No. 3,365,315 (Beck et al.); U.S. Pat. No. 4,391,646 (Howell); and U.S. Pat. No. 4,767,726 (Marshall); U.S. Pat. App. Pub. No. 2006/0122049 (Marshall et. al), and Int. Pat. App. Pub. No. WO 2012/033810 (Amos et al.). Techniques for preparing glass bubbles typically include heating milled frit, commonly referred to as "feed", which contains a blowing agent (e.g., sulfur or a compound of oxygen and sulfur).

Although the frit and/or the feed may have any composition that is capable of forming a glass, typically, on a total weight basis, the frit comprises from 50 to 90 percent of $SiO_2$, from 2 to 20 percent of alkali metal oxide, from 1 to 30 percent of $B_2O_3$, from 0.005-0.5 percent of sulfur (for example, as elemental sulfur, sulfate or sulfite), from 0 to 25 percent divalent metal oxides (for example, CaO, MgO, BaO, SrO, ZnO, or PbO), from 0 to 10 percent of tetravalent metal oxides other than $SiO_2$ (for example, $TiO_2$, $MnO_2$, or $ZrO_2$), from 0 to 20 percent of trivalent metal oxides (for example, $Al_2O_3$, $Fe_2O_3$, or $Sb_2O_3$), from 0 to 10 percent of oxides of pentavalent atoms (for example, $P_2O_5$ or $V_2O_5$), and from 0 to 5 percent fluorine (as fluoride) which may act as a fluxing agent to facilitate melting of the glass composition. Additional ingredients are useful in frit compositions and can be included in the frit, for example, to contribute particular properties or characteristics (for example, hardness or color) to the resultant glass bubbles.

In some embodiments, the glass bubbles useful for the composite particle disclosed herein have a glass composition comprising more alkaline earth metal oxide than alkali metal oxide. In some of these embodiments, the weight ratio of alkaline earth metal oxide to alkali metal oxide is in a range from 1.2:1 to 3:1. In some embodiments, the glass bubbles have a glass composition comprising $B_2O_3$ in a range from 2 percent to 6 percent based on the total weight of the glass bubbles. In some embodiments, the glass bubbles have a glass composition comprising up to 5 percent by weight $Al_2O_3$, based on the total weight of the glass bubbles. In some embodiments, the glass composition is essentially free of $Al_2O_3$. "Essentially free of $Al_2O_3$" may mean up to 5, 4, 3, 2, 1, 0.75, 0.5, 0.25, or 0.1 percent by weight $Al_2O_3$. Glass compositions that are "essentially free of $Al_2O_3$" also include glass compositions having no $Al_2O_3$. Glass bubbles useful for the composite particle disclosed herein may have, in some embodiments, a chemical composition wherein at least 90%, 94%, or even at least 97% of the glass comprises at least 67% $SiO_2$, (e.g., a range of 70% to 80% $SiO_2$), a range of 8% to 15% of an alkaline earth metal oxide (e.g., CaO), a range of 3% to 8% of an alkali metal oxide (e.g., $Na_2O$), a range of 2% to 6% $B_2O_3$, and a range of 0.125% to 1.5% $SO_3$. In some embodiments, the glass comprises in a range from 30% to 40% Si, 3% to 8% Na, 5% to 11% Ca, 0.5% to 2% B, and 40% to 55% O, based on the total of the glass composition.

Examples of commercially available materials suitable for use as the hollow, ceramic spheroid include glass bubbles marketed by 3M Company, Saint Paul, Minn., as "3M GLASS BUBBLES" in grades K1, K15, K20, K25, K37, K46, S15, S22, S32, S35, S38, S38HS, S38XHS, S42HS, S42XHS, S60, S60HS, iM30K, iM16K, XLD3000, XLD6000, and G-65, and any of the HGS series of "3M GLASS BUBBLES"; glass bubbles marketed by Potters Industries, Carlstadt, N.J., under the trade designations "Q-CEL HOLLOW SPHERES" (e.g., grades 30, 6014, 6019, 6028, 6036, 6042, 6048, 5019, 5023, and 5028); and hollow glass particles marketed by Silbrico Corp., Hodgkins, Ill. under the trade designation "SIL-CELL" (e.g., grades SIL 35/34, SIL-32, SIL-42, and SIL-43).

The discrete, hollow, ceramic spheroids may also be made from ceramics such as alpha-alumina, zirconia, and alumina silicates. In some embodiments, the discrete, hollow, ceramic microspheres are aluminosilicate microspheres extracted from pulverized fuel ash collected from coal-fired power stations (i.e., cenospheres). Useful cenospheres include those marketed by Sphere One, Inc., Chattanooga, Tenn., under the trade designation "EXTENDOSPHERES HOLLOW SPHERES" (e.g., grades SG, MG, CG, TG, HA, SLG, SL-150, 300/600, 350 and FM-1). Other useful hollow, ceramic spheroids include silica-alumina ceramic hollow spheres with thick walls marketed by Valentine Chemicals of Lockport, La., as ZEEOSPHERES CERAMIC MICROSPHERES in grades N-200, N-200PC, N-400, N-600, N-800, N1000, and N1200.

Amorphous fluoropolymers useful for the composite particles disclosed herein may include one or more interpolymerized units derived from one or more principal monomers. Typically, the fluoropolymer is derived from at least two principal monomers. Examples of suitable candidates for the principal monomer(s) include fluoroolefins independently represented by formula $C(R)_2=CF-Rf$, where Rf is fluorine or a perfluoroalkyl having from 1 to 8, in some embodiments 1 to 3, carbon atoms, and each R is independently hydrogen, fluorine, or chlorine. In some embodiments, the fluoropolymer is a copolymer of only fluoroolefin monomers represented by formula $C(R)_2=CF-Rf$. Some examples of fluoroolefins represented by this formula include tetrafluoroethylene (TFE), hexafluoropropylene (HFP), trifluorochloroethylene (CTFE), and partially fluorinated olefins (e.g., vinylidene fluoride (VDF), pentafluoropropylene, and trifluoroethylene). Further examples of suitable monomers to make the fluoropolymers include perfluorovinyl ethers (e.g., perfluoroalkyl vinyl ethers (PAVE)) and perfluoroalkoxyalkyl vinyl ethers (PAOVE). Any combination of a perfluoroalkyl vinyl ether, a perfluoroalkoxyalkyl vinyl ether; and at least one fluoroolefin independently represented by formula $CR_2=CF-Rf$ may be useful in the fluoropolymers in the composite particles disclosed herein.

Amorphous fluoropolymers include, for example, those referred to in the art as "fluoroelastomer gums" and "perfluoroelastomer gums". Amorphous fluoropolymers also include, for example, those referred to in the art as FKM and FFKM. Amorphous fluoropolymers are non-crystalline, whereas fluoroplastics are typically at least partially crystalline. Whether or not a particular fluoropolymer will be amorphous can depend, for example, on the selection of the monomers, the relative amounts of the monomers, and the molecular weight of the fluoropolymer. Those skilled in the art are capable of selecting specific interpolymerized units at appropriate amounts to form an amorphous fluoropolymer.

In some embodiments, polymerized units derived from at least one of PAVE or PAOVE monomers are present in the amorphous fluoropolymer at up to 50 mole percent of the fluoropolymer, in some embodiments up to 30 mole percent or up to 10 mole percent. Suitable perfluorinated ethers include those of the formula $CF_2=CFO-(CF_2)_m-(O(CF_2)_p)_n-ORf^1$, wherein $Rf^1$ is a perfluorinated ($C_1$-$C_4$) alkyl group, m is 1 to 4, n is 0 to 6, and p is 1 to 2, or $CF_2=CF(CF_2)_m-O-Rf^2$, wherein m is 1 to 4 and $Rf^2$ is a perfluorinated aliphatic group optionally containing O atoms. Examples of these perfluoroalkoxyalkyl vinyl ethers include $CF_2=CFOCF_2OCF_3$, $CF_2=CFOCF_2OCF_2CF_3$, $CF_2=CFOCF_2CF_2OCF_3$, $CF_2=CFOCF_2CF_2CF_2OCF_3$, $CF_2=CFOCF_2CF_2CF_2CF_2OCF_3$, $CF_2=CFOCF_2CF_2OCF_2CF_3$, $CF_2=CFOCF_2CF_2OCF_2CF_3$, $CF_2=CFOCF_2CF_2CF_3$, $CF_2=CFOCF_2CF_2OCF_2OCF_3$, $CF_2=CFOCF_2CF_2OCF_2OCF_2CF_3$, $CF_2=CFOCF_2CF_2OCF_2CF_2OCF_3$, $CF_2=CFOCF_2CF_2OCF_2CF_2CF_2OCF_3$, $CF_2=CFOCF_2CF_2OCF_2CF_2CF_2CF_2OCF_3$, $CF_2=CFOCF_2CF_2(OCF_2)_3OCF_3$, $CF_2=CFOCF_2CF_2(OCF_2)_4OCF_3$, $CF_2=CFOCF_2CF_2OCF_2OCF_3$, $CF_2=CFOCF_2CF_2OCF_2CF_2CF_3$ and $CF_2=CFOCF_2CF_2OCF_2CF_2OCF_2CF_2CF_3$. Mixtures of perfluoroalkyl vinyl ethers (PAVE) and perfluoroalkoxyalkyl vinyl ethers (PAOVE) may also be employed. Examples of perfluoroalkoxyalkyl allyl ethers that may be included in the amorphous fluoropolymer include $CF_2=CFCF_2OCF_2CF_2OCF_3$, $CF_2=CFCF_2OCF_2CF_2CF_2OCF_3$ and $CF_2=CFCF_2OCF_2OCF_3$. These perfluorinated ethers are typically liquids and may be pre-emulsified with an emulsifier before its copolymerization with the other comonomers, for example, addition of a gaseous fluoroolefin.

In some embodiments, amorphous fluoropolymers useful for the composite particles disclosed herein are copolymers of hydrogen-containing, non-fluorinated monomers such as olefins (e.g., ethylene and propylene). In some embodiments, polymerized units derived from non-fluorinated olefin monomers are present in the amorphous fluoropolymer at up to 25 mole percent of the amorphous fluoropolymer, in some embodiments up to 10 mole percent or up to 3 mole percent.

Examples of amorphous fluoropolymers useful for the composite particles disclosed herein include a TFE/propylene copolymer, a TFE/propylene/VDF copolymer, a VDF/HFP copolymer, a TFE/VDF/HFP copolymer, a TFE/perfluoromethyl vinyl ether (PMVE) copolymer, a TFE/$CF_2=CFOC_3F_7$ copolymer, a TFE/$CF_2=CFOCF_3$/$CF_2=CFOC_3F_7$ copolymer, a TFE/$CF_2=C(OC_2F_5)_2$ copolymer, a TFE/ethyl vinyl ether (EVE) copolymer, a TFE/butyl vinyl ether (BVE) copolymer, a TFE/EVE/BVE copolymer, a VDF/$CF_2=CFOC_3F_7$ copolymer, an ethylene/HFP copolymer, a TFE/HFP copolymer, a CTFE/VDF copolymer, a TFE/VDF copolymer, a TFE/VDF/PMVE/ethylene copolymer, and a TFE/VDF/$CF_2=CFO(CF_2)_3OCF_3$ copolymer. In some embodiments, the amorphous fluoropolymer is a copolymer of vinylidene fluoride and hexafluoropropylene; a copolymer of vinylidene fluoride, hexafluoropropylene, and tetrafluoroethylene; a copolymer of vinylidene fluoride, hexafluoropropylene, tetrafluoroethylene, and perfluoromethylvinyl ether; a copolymer of vinylidene fluoride, propylene, and tetrafluoroethylene; a copolymer of vinylidene fluoride, hexafluoropropylene, tetrafluoroethylene, perfluoromethylvinyl ether, and ethylene; In some embodiments, the amorphous fluoropolymer is not a homopolymer of tetrafluoroethylene. In some embodiments, the amorphous fluoropolymer is a copolymer of vinylidene fluoride and hexafluoropropylene. In some embodiments, the amorphous fluoropolymer is a copolymer of vinylidene fluoride, hexafluoropropylene, and tetrafluoroethylene.

The amorphous fluoropolymer useful for the composite particles disclosed herein is prepared by polymerization of the any of the monomers described above. In some embodiments, an aqueous emulsion polymerization can be carried out continuously under steady-state conditions. In this embodiment, for example, an aqueous emulsion of monomers (e.g., including any of those described above), water, emulsifiers, buffers and catalysts are fed continuously to a stirred reactor under optimum pressure and temperature conditions while the resulting emulsion or suspension is continuously removed. In some embodiments, batch or semibatch polymerization is conducted by feeding the aforementioned ingredients into a stirred reactor and allowing them to react at a set temperature for a specified length of time or by charging ingredients into the reactor and feeding the monomers into the reactor to maintain a constant pressure until a desired amount of polymer is formed. After polymerization, unreacted monomers are removed from the reactor effluent latex by vaporization at reduced pressure. The fluoropolymer can be recovered from the latex by coagulation or left in suspension for coating the hollow, ceramic spheroids.

The polymerization is generally conducted in the presence of a free radical initiator system, such as ammonium persulfate. The polymerization reaction may further include other components such as chain transfer agents and complexing agents. The polymerization is generally carried out at a temperature in a range from 10° C. and 100° C., or in a range from 30° C. and 80° C. The polymerization pressure is usually in the range of 0.3 MPa to 30 MPa, and in some embodiments in the range of 2 MPa and 20 MPa.

When conducting emulsion polymerization, perfluorinated or partially fluorinated emulsifiers may be useful. Generally these fluorinated emulsifiers are present in a range from about 0.02% to about 3% by weight with respect to the polymer. Polymer particles produced with a fluorinated emulsifier typically have an average diameter, as determined by dynamic light scattering techniques, in range of about 10 nanometers (nm) to about 300 nm, and in some embodiments in range of about 50 nm to about 200 nm.

Examples of suitable emulsifiers perfluorinated and partially fluorinated emulsifier having the formula [$R_f$—O-L-COO$^-$]$_i$X$^{i+}$ wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, X$^{i+}$ represents a cation having the valence i and i is 1, 2 or 3. (See, e.g. U.S. Pat. App. Pub. Nos. 2007/0015864, 2007/0015865, and 2007/0142541 to Hinzter et al. and U.S. Pat. App. Pub. Nos. 2006/0199898 and 2007/0117915 (Funaki et al.). Further suitable emulsifiers include fluorinated polyether emulsifiers as described in U.S. Pat. No. 6,429,258 to Morgan et al. and perfluorinated or partially fluorinated alkoxy acids and salts thereof wherein the perfluoroalkyl component of the perfluoroalkoxy has 4 to 12 carbon atoms, or 7 to 12 carbon atoms. (See, e.g. U.S. Pat. No. 4,621,116 to Morgan). Further suitable emulsifiers include perfluorinated or partially fluorinated ether containing emulsifiers as described in U.S. Pat. Publ. Nos. 2006/0223924 to Tsuda; Nobuhiko et al., 2007/0060699 to Tsuda; Nobuhiko et al. 2007/0142513 to Tsuda; Nobuhiko et al and 2006/0281946 to Morita; Shigeru et al. Fluoroalkyl, for example, perfluoroalkyl, carboxylic acids and salts thereof having 6-20 carbon atoms, such as ammonium perfluorooctanoate (APFO) and ammonium perfluorononanoate. (See, e.g. U.S. Pat. No. 2,559,752 to Berry) may also be useful. If desired, the emulsifiers can be removed or recycled from the fluoropolymer latex as described in U.S. Pat. No. 5,442,097 to Obermeier et al., U.S. Pat. No. 6,613,941 to Felix et al., U.S. Pat. No. 6,794,550 to Hintzer et al., U.S. Pat. No. 6,706,193 to Burkard et al. and U.S. Pat. No. 7,018,541 Hintzer et al.

In some embodiments, the polymerization process may be conducted with no emulsifier (e.g., no fluorinated emulsifier). Polymer particles produced without an emulsifier typically have an average diameter, as determined by dynamic light scattering techniques, in a range of about 40 nm to about 500 nm, typically in range of about 100 nm and about 400 nm, and suspension polymerization will typically produce particles sizes up to several millimeters.

In some embodiments, a water soluble initiator can be useful to start the polymerization process. Salts of peroxy sulfuric acid, such as ammonium persulfate, are typically applied either alone or sometimes in the presence of a reducing agent, such as bisulfites or sulfinates (disclosed in U.S. Pat. No. 5,285,002 Grootaert and U.S. Pat. No. 5,378,782 to Grootaert) or the sodium salt of hydroxy methane sulfinic acid (sold under the trade designation "RONGALIT", BASF Chemical Company, New Jersey). Most of these initiators and the emulsifiers have an optimum pH-range where they show most efficiency. For this reason, buffers are sometimes useful. Buffers include phosphate, acetate or carbonate buffers or any other acid or base, such as ammonia or alkali metal hydroxides. The concentration range for the initiators and buffers can vary from 0.01% to 5% by weight based on the aqueous polymerization medium.

In some embodiments, the amorphous fluoropolymer latex may be used without isolating the amorphous fluoropolymer to prepare the composite particles disclosed herein as described in further detail below. However, it may be useful in some cases to coagulate, wash, and dry the fluoropolymer latex. To coagulate the obtained fluoropolymer latex, any coagulant which is commonly used for coagulation of a fluoropolymer latex may be used, and it may, for example, be a water soluble salt (e.g., calcium chloride, magnesium chloride, aluminum chloride or aluminum nitrate), an acid (e.g., nitric acid, hydrochloric acid or sulfuric acid), or a water-soluble organic liquid (e.g., alcohol or acetone). The amount of the coagulant to be added may be in range of 0.001 to 20 parts by mass, for example, in a range of 0.01 to 10 parts by mass per 100 parts by mass of the fluorinated elastomer latex. Alternatively or additionally, the fluorinated elastomer latex may be frozen for coagulation. The coagulated fluoropolymer can be collected by filtration and washed with water. The washing water may, for example, be ion exchanged water, pure water or ultrapure water. The amount of the washing water may be from 1 to 5 times by mass to the fluoropolymer, whereby the amount of the emulsifier attached to the fluoropolymer can be sufficiently reduced by one washing.

The amorphous fluoropolymer on the composite particle according to the present disclosure may be crosslinked or non-crosslinked. In some embodiments, the fluoropolymer is not crosslinked. Such fluoropolymers include fluoroelastomer gums, which are typically uncured, amorphous fluoropolymers. In some embodiments, the amorphous fluoropolymers have cure sites that allow them to ultimately be crosslinked.

Curable amorphous fluoropolymers useful as the fluoropolymer layer in the composite particle disclosed herein typically include a chloro, bromo-, or iodo-cure site. In some embodiments, the amorphous fluoropolymer comprises a bromo- or iodo-cure site. In some of these embodiments, the amorphous fluoropolymer comprises an iodo-cure site. The cure site can be an iodo-, bromo-, or chloro-group chemically bonded at the end of a fluoropolymer chain. The weight percent of elemental iodine, bromine, or chlorine in the curable fluoropolymer may range from about 0.2 wt. % to about 2 wt. %, and, in some embodiments, from about 0.3 wt. % to about 1 wt. %. To incorporate a cure site end group into the amorphous fluoropolymer, any one of an iodo-chain transfer agent, a bromo-chain transfer agent or a chloro-chain transfer agent can be used in the polymerization process. For example, suitable iodo-chain transfer agents include perfluoroalkyl or chloroperfluoroalkyl groups having 3 to 12 carbon atoms and one or two iodo-groups. Examples of iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutane and mixtures thereof. Suitable bromo-chain transfer agents include perfluoroalkyl or chloroperfluoroalkyl groups having 3 to 12 carbon atoms and one or two iodo-groups.

Chloro-, bromo-, and iodo-cure site monomers may also be incorporated into the curable amorphous fluoropolymer by including cure site monomers in the polymerization reaction. Examples of cure site monomers include those of the formula $CX_2$=$CX(Z)$, wherein each X is independently H or F, and Z is I, Br, or $R_f$—Z, wherein Z is I or Br and $R_f$ is a perfluorinated or partially perfluorinated alkylene group optionally containing O atoms. In addition, non-fluorinated bromo- or iodo-substituted olefins, e.g., vinyl iodide and allyl iodide, can be used. In some embodiments, the cure site monomers is $CH_2$=$CHI$, $CF_2$=$CHI$, $CF_2$=$CFI$, $CH_2$=$CHCH_2I$, $CF_2$=$CFCF_2I$, $CH_2$=$CHCF_2CF_2I$, $CF_2$=$CFCH_2CHI$, $CF_2$=$CFCF_2CF_2I$, $CH_2$=$CH(CF_2)_6CH_2CH_2I$, $CF_2$=$CFOCF_2CF_2I$, $CF_2$=$CFOCF_2CF_2CF_2I$, $CF_2$=$CFOCF_2CF_2CH_2I$, $CF_2$=$CFCF_2OCH_2CH_2I$, $CF_2$=$CFO(CF_2)_3OCF_2CF_2I$, $CH_2$=$CHBr$, $CF_2$=$CHBr$, $CF_2$=$CFBr$, $CH_2$=$CHCH_2Br$, $CF_2$=$CFCF_2Br$, $CH_2$=$CHCF_2CF_2Br$, $CF_2$=$CFOCF_2CF_2Br$, $CF_2$=$CFCl$, $CF_2$=$CFCF_2Cl$, or a mixture thereof.

The chain transfer agents having the cure site and/or the cure site monomers can be fed into the reactor by batch charge or continuously feeding. Because feed amount of chain transfer agent and/or cure site monomer is relatively small compared to the monomer feeds, continuous feeding of small amounts of chain transfer agent and/or cure site monomer into the reactor is difficult to control. Continuous feeding can be achieved by a blend of the iodo-chain transfer agent in one or more monomers. Examples of monomers useful for such a blend include hexafluoropropylene (HFP) and perfluoromethyl vinyl ether (PMVE).

In some embodiments in which the fluoropolymer useful in the composite particle disclosed herein is a curable, the curable fluoropolymer is perhalogenated, in some embodiments perfluorinated, and typically at least 50 mole percent (mol %) of its interpolymerized units are derived from TFE and/or CTFE, optionally including HFP. The balance of the interpolymerized units of the curable fluoropolymer (10 to 50 mol %) can be made up of one or more perfluoroalkyl vinyl ethers and/or perfluoroalkoxy vinyl ethers, and a suitable cure site monomer. When the curable fluoropolymer is not perfluorinated, it may contain, in some embodiments, from about 5 mol % to about 95 mol % of its interpolymerized units derived from TFE, CTFE, and/or HFP, from about 5 mol % to about 90 mol % of its interpolymerized units derived from VDF, ethylene, and/or propylene, up to about 40 mol % of its interpolymerized units derived from a vinyl ether, and from about 0.1 mol % to about 5 mol %, in some embodiments from about 0.3 mol % to about 2 mol %, of a suitable cure site monomer.

Adjustment of, for example, the concentration and activity of the initiator, the concentration of each of the reactive monomers, the temperature, the concentration of any chain transfer agent, and the solvent using techniques known in the art can be useful to control the molecular weight of the amorphous fluoropolymer useful in the composite particle disclosed herein. In some embodiments, amorphous fluoropolymers useful for the composite particles disclosed herein have weight average molecular weights in a range from 10,000 grams per mole to 200,000 grams per mole. In some embodiments, the weight average molecular weight is at least 15,000, 20,000, 25,000, 30,000, 40,000, or 50,000 grams per mole up to 100,000, 150,000, 160,000, 170,000, 180,000, or up to 190,000 grams per mole. In some of these embodiments, the fluoropolymer is a fluoroelastomer gum that is curable. In contrast, fluoroplastics, which are typically at least partially crystalline, typically have weight average molecular weights in a range from 200,000 grams per mole to 1,000,000 grams per mole. In some embodiments, amorphous fluoropolymers useful for the composite particles disclosed herein may have a Mooney viscosity in a range from 0.1 to 100 (ML 1+10) at 100° C. according to ASTM D1646-06 TYPE A. In some embodiments, fluoropolymers useful in the composite particles disclosed herein have a Mooney viscosity in a range from 0.1 to 20, 0.1 to 10, or 0.1 to 5 (ML 1+10) at 100° C. according to ASTM D1646-06 TYPE A.

Amorphous fluoropolymers typically have a distribution of molecular weights and compositions. Weight average molecular weights can be measured, for example, by gel permeation chromatography (i.e., size exclusion chromatography) using techniques known to one of skill in the art.

Composite particles according to the present disclosure may be made, for example, by a process that includes combining an amorphous fluoropolymer dispersion with a plurality of hollow, ceramic spheroids such that a fluoropolymer layer is disposed on at least a portion of the spheroids. The amorphous fluoropolymer dispersion typically comprises a continuous aqueous phase and a dispersed phase. The continuous aqueous phase includes water and optionally one or more water-soluble organic solvents (e.g., glyme, ethylene glycol, propylene glycol, methanol, ethanol, N-methylpyrrolidone, and/or propanol) and optionally one or more surfactants. The dispersed phase includes the amorphous fluoropolymer, for example, as described in any of the above embodiments of the amorphous fluoropolymer. The dispersion may be, for example, the amorphous fluoropolymer latex described above to which the hollow, ceramic spheroids and optionally the organic solvent, the surfactant, and additional water may be added.

In some embodiments, the organic solvent may be capable of swelling or dissolving the amorphous fluoropolymer that is present in the dispersed phase thereby facilitating formation of the amorphous fluoropolymer layer upon combining the hollow, ceramic spheroids with the dispersion. Examples of useful solvents for swelling certain amorphous fluoropolymers include ethylene glycol, N-methylpyrrolidone, acetone, and 2-butanone. The amount of organic solvent to add will vary with the specific fluoropolymer and concentration but may be added in an amount of up to 5 percent based on the weight of the dispersion. In some embodiments, the organic solvent is present in an amount in a range from 0.25 to 5%, 0.25 to 2.5%, or 0.5 to 2%, based on the total weight of the dispersion.

In some embodiments, the dispersion contains a surfactant. The surfactant is typically a nonionic surfactant and may be a fluorinated or hydrocarbon surfactant. Useful fluorinated surfactants include those available, for example, from 3M Company, St. Paul, Minn., under the trade designation "FC-4430" and from E.I. du Pont de Nemours and Co., Wilmington, Del., under the trade designation "ZONYL" (e.g., "ZONYL FSO"). The amount of surfactant to add will vary with the specific amorphous fluoropolymer and concentration but may be added in an amount of up to 5 percent, based on the weight of the dispersion. In some embodiments, the surfactant is present in an amount in a range from 0.25 to 5%, 0.25 to 2.5%, or 0.5 to 2%, based on the total weight of the dispersion.

Various amounts of water may be useful in the dispersion for making the composite particles according to the present disclosure. If the amorphous fluoropolymer latex described above is used for treating the hollow, ceramic spheroids without first isolating the amorphous fluoropolymer, additional water may be added to the dispersion, but this is not a requirement. In some embodiments, the dispersion includes 15 to 85 percent water, based on the total weight of the dispersion. In some embodiments, the dispersion includes a range from 50 to 85 percent or 65 to 80 percent water, based on the total weight of the dispersion. In some embodiments, it may be useful to minimize the amount of water in the dispersion. This may be useful to facilitate drying of the composite particles and/or to prevent agglomeration during drying. In some embodiments, the dispersion includes a range from 15 to 40 percent, 15 to 35 percent, or 20 to 30 percent water, based on the total weight of the dispersion.

Once combined, typically with mixing, the amorphous fluoropolymer layer forms on the hollow, ceramic spheroids on a time scale of seconds to minutes or hours, although longer times can also be useful. The amounts of chemical components will vary depending on, for example, the total surface area of the hollow, ceramic spheroids, concentration, and desired thickness of the amorphous fluoropolymer layer. Once the composite particles are formed they can be isolated by conventional separation techniques such as, for example, filtration, optional washing, and drying.

The amorphous fluoropolymer may be used in any amount that results in the amorphous fluoropolymer layer being disposed on a hollow, ceramic spheroid without causing hollow, ceramic spheroids to aggregate. In some embodiments, the composite particle comprises at least 75% by weight of ceramic (including any of the ceramics described in any of the above embodiments), based on the total weight of the composite particle. In some of these embodiments, the composite particle comprises at least 85, 90, 95, 97, or 98 percent weight ceramic, based on the total weight of the composite particle. In some embodiments, the composite particle comprises up to 30 percent by weight of the amorphous fluoropolymer, based on the total weight of the composite particle, without aggregation of the composite particles. However, in some embodiments, the composite particles comprises up to 25, 20, 15, 10, 5, less than 5, less than 3, 2.99, 2.5, or 2.25 percent by weight of the amorphous fluoropolymer, based on the total weight of the composite particle. Surprisingly, composite particles that comprise less than 3 (e.g., up to 2.99, 2.5, or 2.25 percent by weight) amorphous fluoropolymer, based on the total weight of the composite particle, have a resistance to degradation caused by seawater that is similar to composite particles with much higher amounts of amorphous fluoropolymer (e.g., 10 or 25 percent by weight) as shown in Examples 2, 3, and 4, below.

Figure 2:
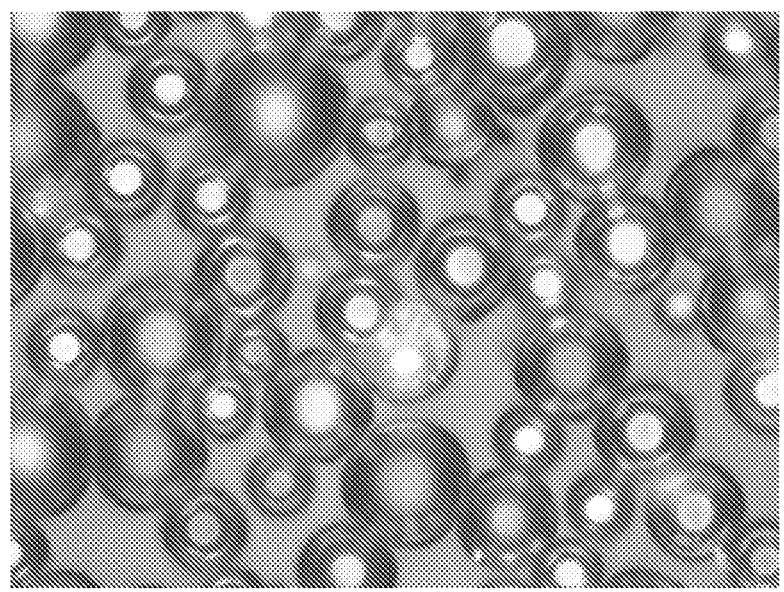
FIG. 2 is a photograph of the discrete composite particles of Example 4 taken at a magnification of 100×.

A photograph of an example of a plurality of the composite particles according to the present disclosure and/or made according to the method described is shown in FIG. 2. It is evident from the photograph that the composite particles are discrete particles. That is, they are discrete, coated particles not bound together in a polymer matrix.

In some embodiments, the amorphous fluoropolymer useful for the composite particle disclosed herein is crosslinked. In these embodiments, the amorphous fluoropolymer is typically coated as a curable composition, which may be a fluoroelastomer gum as described above, and cured (e.g., by heating at a temperature effective to cure the composition) after the hollow, ceramic spheroid is coated. Curable amorphous fluoropolymers, including those described in any of the above embodiments, can be included in compositions that include a peroxide, polyol, or polyamine crosslinking system. In some embodiments, curable, amorphous fluoropolymer compositions include a peroxide. Typically peroxides useful for practicing the present disclosure are acyl peroxides. Acyl peroxides tend to decompose at lower temperatures than alkyl peroxides and allow for lower temperature curing. In some of these embodiments, the peroxide is di(4-t-butylcyclohexyl)peroxydicarbonate, di(2-phenoxyethyl)peroxydicarbonate, di(2,4-dichlorobenzoyl) peroxide, dilauroyl peroxide, decanoyl peroxide, 1,1,3,3-tetramethylethylbutylperoxy-2-ethylhexanoate, 2,5-dimethyl-2,5-di(2-ethylhexanoylperoxy)hexane, disuccinic acid peroxide, t-hexyl peroxy-2-ethylhexanoate, di(4-methylbenzoyl) peroxide, t-butyl peroxy-2-ethylhexanoate, benzoyl peroxide, t-butylperoxy 2-ethylhexyl carbonate, or t-butylperoxy isopropyl carbonate. In some embodiments, the peroxide is a diacyl peroxide. In some of these embodiments, the peroxide is benzoyl peroxide or a substituted benzoyl peroxide (e.g., di(4-methylbenzoyl) peroxide or di(2,4-dichlorobenzoyl) peroxide). The peroxide is present in the curable composition in an amount effective to cure the composition. In some embodiments, the peroxide is present in the composition in a range from 0.5% by weight to 10% by weight versus the weight of the curable composition. In some embodiments, the peroxide is present in the composition in a range from 1% by weight to 5% by weight versus the weight of the curable composition.

In peroxide-cured amorphous fluoropolymer compositions, it is often desirable to include a crosslinker. The crosslinkers may be useful, for example, for providing enhanced mechanical strength in the final cured composition. Accordingly, in some embodiments, the curable composition according to the present disclosure further comprises a crosslinker. Those skilled in the art are capable of selecting conventional crosslinkers based on desired physical properties. Examples of useful crosslinkers include tri (methyl)allyl isocyanurate (TMAIC), triallyl isocyanurate (TAIC), tri(methyl)allyl cyanurate, poly-triallyl isocyanurate (poly-TAIC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, and $CH_2=CH-R_{f1}-CH=CH_2$, wherein $R_{f1}$ is a perfluoroalkylene having from 1 to 8 carbon atoms. The crosslinker is typically present in an amount of 1% by weight to 10% by weight versus the weight of the curable composition. In some embodiments, the crosslinker is present in a range from 2% by weight to 5% by weight versus the weight of the curable composition.

In some embodiments, the curable amorphous fluoropolymer composition includes a polyol in combination with an ammonium salt, a phosphonium salt, or a iminium salt, and a hydroxide or oxide of a divalent metal such as magnesium, calcium, or zinc. Examples of useful polyols include bisphenol AF, bisphenol A, bisphenol S, dihydroxybenzophenone, hydroquinone, 2,4,6-trimercapto-S-triazine, 4,4'-thiodiphenol, and metal salts of any of these. In some embodiments, the curable amorphous fluoropolymer composition includes a polyamine in combination with an oxide of a divalent metal such as magnesium, calcium, or zinc. Examples of useful polyamines include hexamethylenediamine, 4,4'-bis(aminocyclohexyl)methane, and N,N'-dicinnamylidene-1,6-hexamethylenediamine. Carbamate precursors of these may also be useful.

The amorphous fluoropolymer layer may contain optional additives such as, for example, plasticizers, fragrances, colorants, optical brighteners, antioxidants, and ultraviolet light stabilizers. Advantageously, composite particles according to present disclosure do not tend to agglomerate, and a plurality of the composite particles is typically free-flowing when handled, although this is not a requirement. Amorphous fluoropolymer layers made from a homopolymer or copolymer of a perfluoroalkyl vinyl ether; a perfluoroalkoxy vinyl ether; at least one fluoroolefin independently represented by formula $CR_2$=CF—Rf, wherein Rf is fluorine or a perfluoroalkyl having from 1 to 8 carbon atoms and R is hydrogen, fluorine, or chlorine; or a combination thereof are very resistant to exposure to seawater as evidenced in the Examples, below, which is advantageous when the composite particles are used in syntactic foams for deep water insulation. Such resistance to seawater is not likely for all fluorinated polymers (e.g., those that have ester groups connecting fluorinated pendent groups to the polymer backbone such as fluorinated acrylic polymers). Also shown in the Examples below, amorphous fluoropolymer layers have at least one of higher hydrophobicity or better resistance to salt water than fluoroplastics, which are typically at least partially crystalline. For example, when Example 4 is compared with Examples 9 and 10, it is observed that the amorphous fluoropolymer used at a level of 2.5% by weight in Example 4 provides higher hydrophobicity as measured by contact angle than the fluoroplastics used at levels of 2.2% and 2.9% by weight, respectively, in Examples 9 and 10. The resistance to sea water corrosion was also better for Example 4 than Example 9 after 12 weeks.

The "average true density" of hollow, ceramic spheroids is the quotient obtained by dividing the mass of a sample of the spheroids by the true volume of that mass of spheroids as measured by a gas pycnometer. The "true volume" is the aggregate total volume of the spheroids, not the bulk volume. The average true density of the hollow, ceramic spheroids useful in the composite particles disclosed herein is generally at least 0.30 grams per cubic centimeter (g/cc), 0.35 g/cc, or 0.38 g/cc. In some embodiments, the hollow, ceramic spheroids useful in the composite particles disclosed herein have an average true density of up to about 0.6 g/cc. "About 0.6 g/cc" means 0.6 g/cc±five percent. In some of these embodiments, the average true density of the spheroids is up to 0.55 g/cc or 0.50 g/cc. For example, the average true density of the hollow, ceramic spheroids disclosed herein may be in a range from 0.30 g/cc to 0.6 g/cc, 0.30 g/cc to 0.55 g/cc, 0.35 g/cc to 0.60 g/cc, or 0.35 g/cc to 0.55 g/cc. For the purposes of this disclosure, average true density is measured using a pycnometer according to ASTM D2840-69, "Average True Particle Density of Hollow Microspheres". The pycnometer may be obtained, for example, under the trade designation "ACCUPYC 1330 PYCNOMETER" from Micromeritics, Norcross, Ga., or under the trade designations "PENTAPYCNOMETER" or "ULTRAPYCNOMETER 1000" from Formanex, Inc., San Diego, Calif. Average true density can typically be measured with an accuracy of 0.001 g/cc. Accordingly, each of the density values provided above can be ±five percent. Advantageously, the composite particles according to the present disclosure have an average true density that is within 10, 5, or 2.5 percent of the average true density of the hollow, ceramic spheroids at the core of the composite particles. The average true density of the composite particles may be the same as the average true density of the hollow, ceramic spheroids in any of the above embodiments. Or any of the values of the average true density given above for the hollow, ceramic spheroids may be up to 2.5, 5, or 10 percent more than the composite particles disclosed herein.

Advantageously, the composite particles according to the present disclosure and/or made according to the method described above can be made without significant breakage of the hollow, ceramic spheroids. This is evidenced visually, for example, by inspection of the composite particles under a microscope. It is also evidenced by a low difference between the average true density of the composite particles and the average true density of the hollow, ceramic spheroids from which they are made.

The size of the composite particles according to the present disclosure may not differ significantly from the size of the hollow, ceramic spheroids described above. In some embodiments, the composite particles according to the present disclosure have a mean particle size that is within 5, 2.5, or 1 percent of the mean particle size of the hollow, ceramic spheroids. The mean particle size of the composite particles may be any of those described above for the hollow, ceramic spheroids or may be within 5, 2.5, or 1 percent of any of these values. The thickness of the amorphous fluoropolymer layer on the hollow, ceramic spheroids can be varied depending on the amount of the amorphous fluoropolymer in the dispersion used to make the composite particles. In some embodiments, the amorphous fluoropolymer layer has a thickness of at least 5 nanometers (nm), 10 nm, or 15 nm. In some embodiments, the amorphous fluoropolymer layer has a thickness of up to 400 nm, 350 nm, 300 nm, or 200 nm. The thickness of the amorphous fluoropolymer layer may be in a range from 5 nm to 400 nm, 10 nm to 350 nm, or 10 nm to 200 nm, for example.

In some embodiments, including any of the aforementioned embodiments of the composite particle, the amorphous fluoropolymer layer is disposed on the hollow, ceramic spheroid and sufficiently covers the spheroid such that the spheroid is confined within the amorphous fluoropolymer layer. This can be understood to mean that the amorphous fluoropolymer layer sufficiently surrounds the spheroid such that if the fluoropolymer layer and the spheroid were capable of being moved independently, the spheroid could not be separated from the amorphous fluoropolymer layer because of mechanical entrapment. In some of these embodiments, the amorphous fluoropolymer layer completely encloses the spheroid. In other of these embodiments, the amorphous fluoropolymer layer does not completely cover the surface of the spheroid yet still confines it by forming a continuous porous network over the surface of the spheroid. In yet another of these embodiments, the amorphous fluoropolymer layer may cover greater than a hemispherical portion of the spheroid, thereby confining it. In yet another of these embodiments, the amorphous fluoropolymer layer is substantially uniform and complete (i.e., the amorphous fluoropolymer layer forms a substantially complete layer of substantially uniform thickness over the surface of the spheroid). Coverage by the amorphous fluoropolymer layer over and area contained within less than a hemisphere of the spheroid would not confine the spheroid. Likewise, coverage of the entire surface of the spheroid with a amorphous fluoropolymer layer consisting of small unconnected portions would not confine the spheroid.

Figure 3:
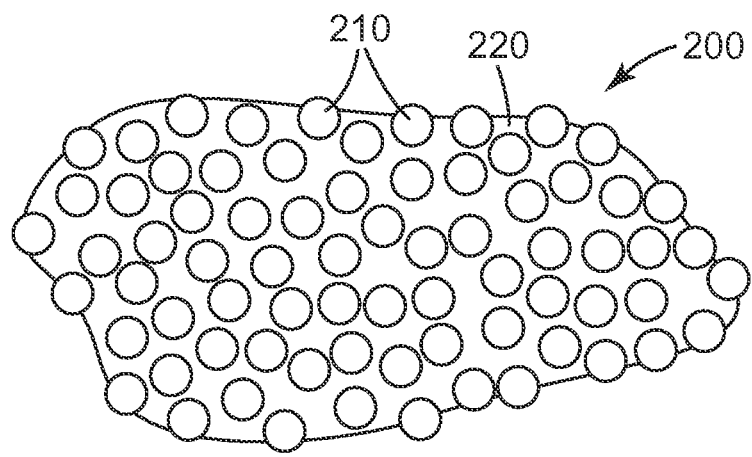
FIG. 3 is a cross-sectional view of an embodiment of a composite material according to the present disclosure.

Composite particles according to the present disclosure can be combined with a matrix material to form a composite material. An exemplary composite material is shown in FIG. 3, wherein composite material 200 comprises composite particles 210 according to the present disclosure (e.g., composite particles 100 as shown in FIG. 1) dispersed in matrix material 220.

The composite material can be readily prepared, for example, by combining the composite particles and matrix material using an appropriate mixing method (e.g., melt-mixing, extruding, stirring, or kneading), typically until the composite particles are at least substantially uniformly dispersed in the binder material. In order to reduce breakage, glass bubbles are typically added to molten thermoplastic (e.g., at a downstream zone of an extruder) instead of being combined with polymer pellets (i.e., not molten) and fed into the throat of the extruder. Composite particles according to the present disclosure wherein the hollow, ceramic spheroid is a glass microbubble typically exhibit improved durability (i.e., less breakage) if combined directly with polymer pellets and fed into the throat of an extruder, than the corresponding glass microbubbles without a fluoropolymer outer coating.

The composite particles and the matrix material may be combined in any ratio, which ratio will typically be strongly influenced by the intended application. Composite particles and composite materials according to the present disclosure may be used in applications where uncoated spheroidal particles (e.g., glass microbubbles or hollow ceramic microspheres) are used.

The composite particles according to the present disclosure are useful, for example, in syntactic foam used in oil and gas subsea drilling operations for insulation properties. High loadings of glass bubbles (40 percent-60 percent by volume) are added to various thermoplastic or thermoset resins to make syntactic foam. Syntactic foam makes it possible to tap oil reserves in deep ocean formations (currently down to 10,000 feet (3048 meters)). There are many performance parameters the foam must meet, including a 20-30 year undersea lifespan. Over time the syntactic foam may have seawater intrusion and seawater could reduce the life expectancy of the glass bubble and the foam. As shown in the Examples, below, composite particles according to the present disclosure have a resistance to seawater that is significantly better than comparative hollow, ceramic spheroids that do not have a fluoropolymer coating. Also, suitable hollow, ceramic spheroids for use in syntactic foams need to survive (e.g., without breaking) a manufacturing process, harsh handling conditions in the field, and the pressures exerted onto the insulation regions in deep water. Hollow, ceramic spheroids for use in underwater applications typically have an isostatic pressure collapse resistance of at least 14 megapascals (MPa) (2000 psi), 20 MPa (3000 psi), 27 Mpa (4000 psi), 38 MPa (5500 psi), or at least 41 MPa (6000 psi), 90% survival. Composite particles according to the present disclosure may have a higher isotactic pressure collapse resistance than uncoated counterpart hollow, ceramic spheroids.

Typically, the matrix material is substantially organic, but inorganic matrix materials may also be useful in some embodiments. The matrix material may be a thermoplastic or a thermoset. Examples of suitable thermoplastic matrix materials (e.g., for syntactic foam applications) include polyolefins (e.g., polyethylene, polypropylene, and polybutylene), polystyrene and high-impact polystyrene, polyamides, polyesters (e.g., polyethylene terephthalate and polycaprolactone), polyether ether ketones, polyetherimides, plasticized polyvinyl chlorides, cellulosic thermoplastics (e.g., cellulose acetate), and polyethers. Suitable thermoset matrix materials can comprise polyfunctional polymerizable monomers and/or oligomers (e.g., epoxy resins, urethane resins, acrylate monomers and/or oligomers, alkyd resins, and phenolic resins). Silicone rubbers may also be useful. The thermoset matrix materials can optionally be used in combination with a suitable one or more curative compounds, for example, as will be known to those of skill in the art.

In some embodiments, the matrix material is not a fluoropolymer. This can mean that the matrix material is a polymer that does not have fluorine atoms on its backbone and/or in pendent groups.

The matrix material may contain one or more additional components such as fillers, rheology modifiers, tackifiers, curatives (e.g., initiators, hardeners, crosslinkers, catalysts), antioxidants, light stabilizers, inhibitors, colorants, fragrances, plasticizers, and lubricants.

Figure 4:
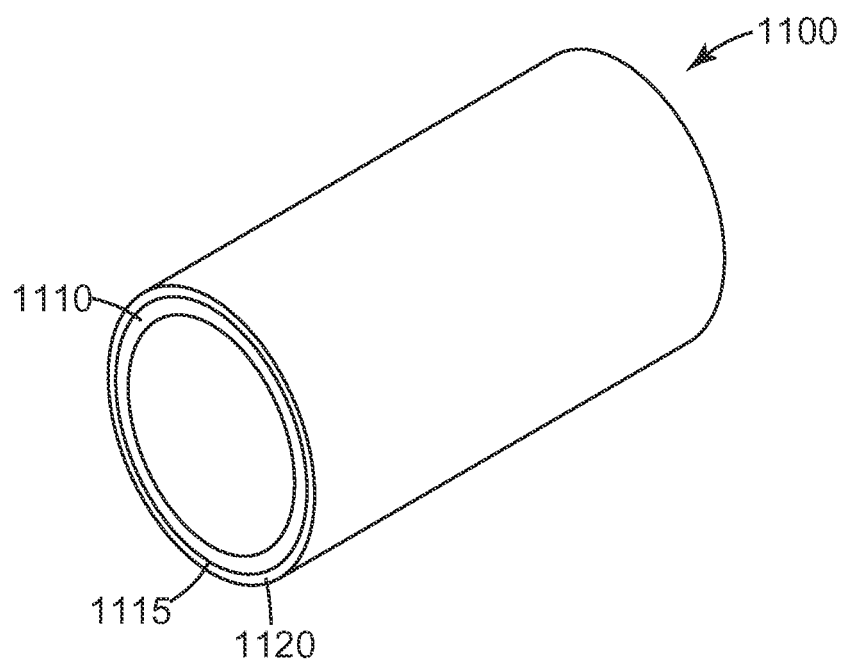
FIG. 4 is a schematic perspective view of a pipe having an insulation layer according to one embodiment of the present disclosure.

The present disclosure provides a conduit having a layer of the composite material described above disposed on an outer surface thereof. Referring now to FIG. 4, in the illustrated embodiment, the conduit is a pipe 1100 comprising a tubular metallic member 1110 having a syntactic foam 1120 disposed on an outer surface 1115 thereof. Syntactic foam 1120 comprises a composite material according to the present disclosure, which includes composite particles disclosed herein and a matrix material. The matrix material can include any of those listed above. In some embodiments, an insulated pipe or conduit according to the present disclosure is submerged in water at a depth of at least 100 meters, 500 meters, 1000 meters, 1500 meters, 2000 meters, 2500 meters, or at least 3000 meters.

Some illustrative examples of syntactic foam manufacturing processes that may be used to provide pipes according to the present disclosure include batch processing, cast curing, meter mixing, reaction injection molding, continuous solids dispersion mixing, compression molding, mechanical shaped blocks of insulation, centrifugal planetary mixing for thermoset formulations and compounding extrusion and injection molding for thermoplastic formulations.

Insulated articles (e.g., conduits or pipes) according to the present disclosure may be prepared, for example, by first mixing composite particles disclosed herein and a premix for a curable thermosetting composition (e.g., for polyurethanes, a mixture comprising liquid polyol resins, chain extenders, catalysts, and driers) and degassing. This premix is mixed with crosslinkers (e.g., for polyurethanes, isocyanate crosslinkers) and immediately dispensed onto a length of pipe (e.g., by pumping into a mold cavity surrounding the length of conduit) to make a conduit having a surface substantially covered with a composite material according to the present disclosure. If the matrix material is a thermoplastic (e.g., polypropylene), insulated articles (e.g., conduits or pipes) according to the present disclosure may be prepared, for example, by dispersing the composite particles disclosed herein in the thermoplastic and coating the mixture onto the pipe in a side extrusion or cross-head extrusion process.

In some embodiments, the conduit according to the present disclosure is a flexible pipe, which typically includes at least helical reinforcement layers (e.g., carbon steel armoring) and polymer sealing layers. In some embodiments, a composite material according to the present disclosure may be located between armoring wires and a polymeric outer sheath in the flexible pipe. Polymer layers may be provided in flexible pipes as extruded layers or tapes. Other examples of articles that can be at least partially covered by a composite material according to the present disclosure include production trees, manifolds, and jumpers, which can be useful, for example, in underwater environments (e.g., submerged in the ocean).

Typically, the amorphous fluoropolymer layer on the composite particles according to the present disclosure does not change the thermal conductivity of the composite materials disclosed herein. In some embodiments, the thermal conductivity of the composite material according to the present disclosure, which includes composite particles disclosed herein, is within 10, 5, 3, 2, or 1 percent of the thermal conductivity of a comparative composite material, wherein the comparative composite material is the same as the composite material disclosed herein except that the hollow, ceramic spheroids in the comparative composite material are not coated with fluoropolymer (or any polymer). The thermal conductivity of a composite material containing hollow, ceramic spheroids can be measured by a variety of techniques known in the art, (e.g., by heat flow measurements in accordance with the ASTM standard C518-98).

Some Embodiments of the Present Disclosure

In embodiment 1, the present disclosure provides a composite particle comprising:
a discrete, hollow, ceramic spheroid, and
a layer of amorphous fluoropolymer disposed on the discrete, hollow, ceramic spheroid, wherein the amorphous fluoropolymer is an amorphous homopolymer or copolymer of a perfluoroalkyl vinyl ether; a perfluoroalkoxy vinyl ether; at least one fluoroolefin independently represented by formula $C(R)_2=CF—Rf$, wherein Rf is fluorine or a perfluoroalkyl having from 1 to 8 carbon atoms and R is hydrogen, fluorine, or chlorine; or a combination thereof.

In embodiment 2, the present disclosure provides a composite particle according to embodiment 1, wherein the fluoropolymer is a copolymer of vinylidene fluoride and hexafluoropropylene; a copolymer of vinylidene fluoride, hexafluoropropylene, and tetrafluoroethylene; a copolymer of vinylidene fluoride, hexafluoropropylene, tetrafluoroethylene, and perfluoromethylvinyl ether; a copolymer of vinylidene fluoride, propylene, and tetrafluoroethylene; or a copolymer of vinylidene fluoride, hexafluoropropylene, tetrafluoroethylene, perfluoromethylvinyl ether, and ethylene.

In embodiment 3, the present disclosure provides a composite particle according to embodiment 1, wherein the amorphous fluoropolymer is a copolymer of vinylidene fluoride and hexafluoropropylene or a copolymer of vinylidene fluoride, hexafluoropropylene, and tetrafluoroethylene.

In embodiment 4, the present disclosure provides a composite particle according to any one of embodiments 1, 2, or 3, wherein the amorphous fluoropolymer is not a homopolymer of tetrafluoroethylene.

In embodiment 5, the present disclosure provides a composite particle according to any one of embodiments 1 to 4, wherein the amorphous fluoropolymer is not a copolymer of tetrafluoroethylene.

In embodiment 6, the present disclosure provides a composite particle according to any one of embodiments 1 to 5, wherein the amorphous fluoropolymer has a Mooney viscosity in a range from 0.1 to 100 (ML 1+10) at 100° C. according to ASTM D1646-06 TYPE A.

In embodiment 7, the present disclosure provides a composite particle according to any one of embodiments 1 to 6, wherein the amorphous fluoropolymer has a weight average molecular weight in a range from 10,000 grams per mole to 200,000 grams per mole.

In embodiment 8, the present disclosure provides a composite particle according to any one of embodiments 1 to 5, wherein the amorphous fluoropolymer is crosslinked.

In embodiment 9, the present disclosure provides a composite particle according to any one of embodiments 1 to 6 or 8, wherein the amorphous fluoropolymer is not crosslinked.

In embodiment 10, the present disclosure provides a composite particle according to any one of embodiments 1 to 9, wherein the composite particle comprises at least 75 percent by weight of ceramic, based on the total weight of the composite particle.

In embodiment 11, the present disclosure provides a composite particle according to any one of embodiments 1 to 10, wherein the composite particle comprises at least 97.5 percent by weight of ceramic, based on the total weight of the composite particle.

In embodiment 12, the present disclosure provides the composite particle according to any one of embodiments 1 to 10, wherein the composite particle comprises up to 25 percent by weight of the amorphous fluoropolymer, based on the total weight of the composite particle.

In embodiment 13, the present disclosure provides the composite particle according to embodiment 12, wherein the composite particle comprises less than 3 percent by weight of the amorphous fluoropolymer, based on the total weight of the composite particle.

In embodiment 14, the present disclosure provides the composite particle according to any one of embodiments 1 to 13, wherein the discrete, hollow, ceramic spheroid comprises glass.

In embodiment 15, the present disclosure provides the composite particle according to any one of embodiments 1 to 14, wherein the layer of amorphous fluoropolymer has a thickness of up to 300 nanometers.

In embodiment 16, the present disclosure provides the composite particle according to any one of embodiments 1 to 15, wherein the layer of amorphous fluoropolymer completely encloses the discrete, hollow, ceramic spheroid.

In embodiment 17, the present disclosure provides the composite particle according to any one of embodiments 1 to 16, wherein the discrete, hollow, ceramic spheroid has a maximum dimension of up to one millimeter.

In embodiment 18, the present disclosure provides the composite particle according to any one of embodiments 1 to 17, wherein at least one of the average particle size or the average true density of the composite particle is within 5 percent of the average particle size or the average true density, respectively, of the discrete, hollow, ceramic spheroid.

In embodiment 19, the present disclosure provides a plurality of the composite particles of any one of embodiments 1 to 17.

In embodiment 20, the present disclosure provides a plurality of composite particles according to embodiment 19, wherein the plurality of particles is free-flowing.

In embodiment 21, the present disclosure provides a composite material comprising a plurality of the composite particles embodiment 19 or 20 dispersed in a matrix material.

In embodiment 22, the present disclosure provides the composite material of embodiment 21, wherein the matrix material does not comprise a fluorinated polymer.

In embodiment 23, the present disclosure provides a composite material according to embodiment 21 or 22, wherein the matrix material comprises at least one of polyethylene, polypropylene, silicone rubber, polystyrene, epoxy, or phenolic.

In embodiment 24, the present disclosure provides a composite material according to embodiment 23, wherein the matrix material comprises at least one of polyethylene or polypropylene.

In embodiment 25, the present disclosure provides a conduit having a layer of the composite material of any one of embodiments 21 to 24 disposed on an outer surface thereof.

In embodiment 26, the present disclosure provides a method of making a plurality of the composite particles of any one of embodiments 1 to 18, the method comprising:

providing a dispersion comprising a continuous aqueous phase and a dispersed phase comprising an amorphous fluoropolymer;

combining the dispersion with a plurality of hollow, ceramic spheroids such that a r layer of the amorphous fluoropolymer is disposed on at least a portion of each hollow, ceramic spheroid to form the composite particles, wherein each one of the composite particles contains a discrete, hollow, ceramic spheroid; and separating the composite particles from the continuous aqueous phase.

In embodiment 27, the present disclosure provides a method according to embodiment 26, wherein the dispersion further comprises a surfactant.

In embodiment 28, the present disclosure provides a method according to embodiment 27, wherein the surfactant is a fluorinated surfactant.

In embodiment 29, the present disclosure provides a method according to any one of embodiments 26 to 28, wherein the dispersion comprises in a range from 15 percent to 40 percent water, based on the total weight of the dispersion.

In embodiment 30, the present disclosure provides a method according to any one of embodiments 26 to 28, wherein the dispersion comprises in a range from 55 percent to 85 percent water, based on the total weight of the dispersion.

In embodiment 31, the present disclosure provides a method according to any one of embodiments 26 to 30, further comprising drying the plurality of composite particles.

In embodiment 32, the present disclosure provides a method according to embodiment 31, wherein the plurality of composite particles is free-flowing after drying the plurality of the composite particles.

In embodiment 33, the present disclosure provides a method according to any one of embodiments 26 to 32, wherein the dispersion further comprises organic solvent.

In embodiment 34, the present disclosure provides a method according to embodiment 33, wherein the organic solvent comprises at least one of ethylene glycol, propylene glycol, N-methylpyrrolidone, acetone, or 2-butanone.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Abbreviations used include g=grams; min=minutes; hrs=hours; vol=volume; cc=cubic centimeter; psi=pounds per square inch; ft=feet; wt=weight; RPM=revolutions per minute.

In the following Examples, Comparative Examples, and Illustrative Examples, the deionized water had an electrical resistivity of 18.2 megohm·cm. N-methylpyrrolidone (NMP) (ACS grade, 99+%) was obtained from Alfa Aesar, Ward Hill, Mass.

Test Methods
Burn-Off Tests:

In order to determine the amount of glass bubbles compounded into the polypropylene resin after extrusion and the volume loss due to bubble breakage during extrusion or the damage due to sea water testing the compounded pellets or coated bubbles were exposed to high temperature in a Nabertherm oven (Bremen, Germany) in order to volatilize the polypropylene resin. The oven was set with a temperature ramp profile to run from 200° C. to 550° in 5 hrs. After the temperature reached 550° C., it was kept constant for 12 hrs. The amount of inorganics, i.e. glass bubbles, was calculated from the known amounts of polymer compound before and after burn process.

Percent of glass bubbles=(Mass of residual inorganics after burn/mass of compounded material before burn)×100.

Evaluation of Volume Loss Due to Bubble Breakage:

In order to determine the amount of volume loss due to bubble breakage, the density of the residual material after burn off, which is glass bubbles, was calculated using a helium gas pycnometer ("ACCUPCY 1330" from Micromeritics Instrument Corporation, Norcross, Ga.). Percent volume loss was calculated using the initial density of the glass bubble and the density of solid glass (2.54 g/cc) using the equation below:

$$\% \text{ Volume Loss} = \frac{\left(\dfrac{1}{\text{Initial Density of GB}} - \dfrac{1}{\text{Density of Solid Glass}}\right) - \left(\dfrac{1}{\text{Measured Density of GB}} - \dfrac{1}{\text{Density of Solid Glass}}\right)}{\dfrac{1}{\text{Initial Density of GB}} - \dfrac{1}{\text{Density of Solid Glass}}} \times 100$$

Water Adsorption/Hydrophobicity Testing

Water adsorption/hydrophobicity testing was conducted in a Rame-Hart Contact Angle Goniometer (Model 290 Auto). Samples were prepared by adhering one face of a 1 inch (2.5 cm) long piece of 3M Scotch® permanent double sided tape to a plain glass slide (VWR Micro Slides) and generously covering the exposed face with 0.5 g of glass bubbles with a painting brush. Excess of material was removed by nitrogen blowing. A deionized water droplet with a volume of 3 micro liters was placed on top of the bubble's film and the angle between a tangent to the water droplet and the surface measured every three seconds. Table 3 shows the average of three measurements of water contact angles during the Water Adsorption/Hydrophobicity testing for Comparative Example A and examples 2-5. Standard deviation of individual measurements is ±3 degrees.

Simulated Sea Water Damage Testing

In order to test the seawater damage preventing nature of the coatings 40 vol % of the glass bubbles in synthetic sea water (CAS #8363-1, ASTM D1141, obtained from Ricca Chemical Company, Arlington, Tex.) was tested in a 500 mL pressurized stainless steel bomb (obtained from OFI Testing Equipment Inc., Houston, Tex.) at 500 psi (3.4 megapascals) and 60° C. (unless indicated otherwise in Table 2) under nitrogen while stirring constantly. The bubbles are tested in this manner to simulate several real conditions—high pressure to simulate the ocean depth, high temperature to simulate the hot oil flowing through pipe, and seawater for the subsea environment. Samples are taken weekly and are analyzed for specific density by pycnometer testing (described under "Evaluation of Volume Loss due to Bubble Breakage"). If glass bubbles are damaged, they tend to have cracks and defects form at the surface eventually causing the bubble to break. Broken bubbles do not maintain their low density and revert back to the specific gravity of the fused glass—2.54 g/cc. Samples were dried at 105° C. for 70 minutes in a forced air oven and density was measured to see if there is significant bubble breakage indicated by an increase in density. Table 1 shows the formulations and Table 2 shows the density of the coated glass bubbles compared to the uncoated control, week by week, during this simulated subsea aging process. The uncoated bubble density increased from 0.32 g/cc to 0.72 g/cc over the course of 12 weeks. The same bubble coated with a vinylidene fluoride/hexafluoropropylene (VP2/HFP) copolymer, from latex, shows significant improvement (less change in specific gravity).

Glass Bubble Breakage by Extrusion

Bubbles were added to a polypropylene homopolymer obtained from LyondellBasell Industries, Rotterdam, The Netherlands under the trade designation "PRO-FAX 6523" in a 24 mm L/D 28 ThermoElectron (Waltham, Mass.) corotating twin screw extruder ("PRISM TSE 24MC") equipped with 7 heating zones. The polypropylene homopolymer was starve-fed in zone 1 via a resin feeder and passed through a set of kneading blocks to ensure its complete melting before glass bubbles were side fed downstream in zone 4 at 15 wt % loading. At the point of glass bubble side feeding as well as for the rest of the downstream processing, high channel depth conveying elements (OD/ID: 1.75) were used. Zone 1 was water cooled. Zone 2 was set to 175° C. and the rest of the zones were set to 220° C. RPM of the extruder was set to 150 rpm. Bubble breakage was determined as described under "Evaluation of Volume Loss due to Bubble Breakage".

Preparation of Fluoroelastomer Gum Latex, Vinylidene Fluoride/Hexafluoropropylene Copolymer Latex To a stainless steel autoclave was added 51 liters of water, 103 grams of potassium phosphate as buffer, 25.7 grams of diethylmalonate (DEM), 78.8 grams of ammonium persulphate (APS), and a further 1000 grams of water as a rinse. The reactor temperature was heated to, and then maintained, at 73.8° C. Agitation was constant at 450 rpm. After a series of three nitrogen purges and evacuations the final vacuum was broken with 440 grams of hexafluoropropylene (HFP). Vinylidenefluoride (VDF) and HFP were then added at a ratio of HFP/VDF=0.651 until a reaction pressure of 175 psig was reached. As monomer was converted to polymer, the co-monomers were fed to the reactor at a ratio of HFP % VDF=0.651. In this way a constant pressure was maintained until 14,872 grams of VDF was added to the reactor. At the end of the polymerization the remaining monomer was vented, the reactor cooled, and the latex recovered. The latex had a solids content of 31 wt. % and contained 66% fluorine. The Mooney viscosity was 67. The density of the solid elastomer is 1.81 g/cc.

Comparative Example A

"Glass Bubbles 1" were hollow glass microspheres obtained under the trade designation "3M XLD6000 GLASS BUBBLES" from 3M Company, St. Paul, Minn., having a true density of 0.30 g/cc, an average diameter of 18 microns, and isostatic crush strength of 6,000 psi (41 MPa, 90 vol. % survival). The as-supplied glass bubbles were tested without any further treatments.

Comparative Example B

Composite particles comprising a hollow glass microsphere core and a surfactant layer, without a fluoropolymer layer were prepared. Deionized water (300.0 grams (g)), 5.0 g of NMP, and 0.05 g of fluorosurfactant (obtained from 3M Company, St. Paul, Minn., under the trade designation "FC-4430") were mixed in that order before addition of 100.0 g of "Glass Bubbles 1". The composition was shear mixed using a SPEEDMIXER DAC 400 FVZ mixer (available from Flacktek, Inc., Landrum, S.C.) at room temperature (70° F. (21° C.)) for a total of 3 minutes (min) using three sequential intervals: 0.5 min at 1000 RPM, 2 min at 2500 RPM, and 0.5 min at 1000 RPM. The mixture was then slow-rolled (less than 10 RPM) for at least 3 hours before filtering. The mixture was subsequently vacuum filtered through a 22-micron filter and the particles dried at 110° C. in a convection oven for at least 3 hours. The resulting material was rolled to loosen the composite particles. Composition of the mixture is shown in Table 1.

Example 1

Composite particles comprising a hollow glass microsphere and a polymeric layer of fluoroelastomer gum disposed on the microspheres were prepared. Deionized water (300.0 grams (g)), 5.0 g of NMP, 0.5 g of fluorosurfactant (obtained from 3M Company, St. Paul, Minn., under the trade designation "FC-4430"), and 138.3 of the fluoroelastomer gum prepared as above were mixed in that order before addition of 100.0 g of "Glass Bubbles 1". The composition was shear mixed, slow-rolled, filtered, dried and rolled as in Comparative Example B. Compositions of the aqueous dispersions, the average wt % of dried fluoroelastomer on the composite particles and the calculated fluoropolymer thickness are shown in Table 1. Fluoroelastomer amount on the bubbles is expressed as weight percent based on the total weight of the composite particle and assumes that all available polymer was adsorbed onto the surface. This assumption was strengthened by the observation that in this example and in all others the dispersion changed from milky to transparent on filtering. Likewise, the calculated fluoropolymer thickness (Table 1) on the glass bubbles assumes all available polymer was adsorbed onto the bubbles.

Example 1 was tested by the "Glass Bubble Breakage by Extrusion" test vs. Comparative Example A with the result that Example 1 had 26% vol % bubble breakage while Comparative Example A had 37 vol % breakage.

Example 2

Example 2 was done as Example 1 but using different amounts of raw materials as shown in Table 1 and a different mixer (SPEEDMIXER DAC 3000 mixer available from Flacktek, Inc., Landrum, S.C.) with different mixing intervals: 0.5 min at 200 RPM, 2 min at 1000 RPM, and 0.5 min at 200 RPM. Fluoroelastomer gum amount on the bubbles is expressed as weight percent based on the total weight of the composite particle and assumes that all available polymer was adsorbed onto the surface. Likewise, the calculated fluoropolymer thickness (Table 1) on the glass bubbles assumes all available polymer was adsorbed onto the bubbles.

Examples 3-5

Examples 3-5 were done as Example 1 but using different amounts of raw materials as shown in Table 1 and a different mixer (PAPENMAIER 9 liter "TGHK-10" mixer available from Lodige, Warburg, Germany) at 212° F. (100° C.) for a total of 2 hours or until water condensate was not evident on the internal surface of the mixer's lid. Also, in Examples 3-5 the glass bubbles were preloaded into the mixer before the other ingredients. The particles were then dried at 110° C. in a convection oven for at least 1 hr. The resulting material was rolled to loosen the composite particles. Fluoroelastomer amount on the bubbles is expressed as weight percent based on the total weight of the composite particle and assumes that all available polymer was adsorbed onto the surface. Likewise, the calculated fluoropolymer thickness (Table 1) on the glass bubbles assumes all available polymer was adsorbed onto the bubbles. Fluorine was qualitatively identified at the surface of the functionalized glass bubbles using a Bruker Quantax 70 EDS coupled into a Hitachi TM3000 TableTop Scanning Electron Microscope. Point analysis of individual bubbles using a circular area with a diameter of 8 microns gave a fluorine elemental content of at least 3% atomic percent in all samples.

Discrete, spheroidal composite particles from Example 4 were photograph with a Nikon Eclipse ME600 microscope at a magnifications of 100× as shown in FIG. 2.

Example 6

Composite particles comprising a hollow glass microsphere and a polymeric layer of fluoroelastomer gum disposed on the hollow glass microsphere were prepared. DI water (1050.0 grams (g)), 17.5 g of NMP, 0.54 g of fluorosurfactant (obtained from 3M Company, under the trade designation "FC-4430"), and 385.0 of fluoroelastomer gum prepared as described above were mixed in that order before addition of 350.0 g of "Glass Bubbles 2". Glass Bubbles 2 were hollow glass microspheres obtained under the trade designation "3M iM30K GLASS BUBBLES" from 3M Company having a true density of 0.60 g/cc, an average diameter of 18 microns, and an isostatic crush strength of 28,000 psi (190 MPa, 90 vol. % survival). The composition was shear mixed using a SPEEDMIXER DAC 3000 mixer (available from Flacktek, Inc., Landrum, S.C.) at room temperature (70° F. (21° C.)) for a total of 3 minutes (min) using three sequential intervals: 0.5 min at 200 RPM, 2 min at 1000 RPM, and 0.5 min at 200 RPM. The mixture was then slow-rolled (less than 10 RPM) for at least 3 hours before filtering. The mixture was subsequently vacuum filtered through a 22-micron filter and the particles dried at 110° C. in a convection oven for at least 3 hours. The resulting material was rolled to loosen the composite particles. Compositions of the mixtures as well as final (i.e., after drying step) fluoroelastomer average concentrations on composite particles are shown in Table 1, below. Final fluoroelastomer concentration is expressed as weight percent based on the total weight of the composite particle and assumes that all available polymer was adsorbed onto the surface. Likewise, the calculated fluoropolymer thickness (Table 1) on the glass bubbles assumes all available polymer was adsorbed onto the bubbles.

Illustrative Examples 7-8

Composite particles comprising a hollow glass microsphere and a polymeric layer of fluoroplastic disposed on the hollow glass microsphere were prepared. Deionized water (150.0 grams (g)), 2.5 g of NMP, 0.25 g of fluorosurfactant (obtained from 3M Company, under the trade designation "FC-4430"), and either 30.0 g (Illustrative Example 7) or 15.0 g (Illustrative Example 8) of fluoroplastic (a tetrafluoroethylene/hexafluoropropylene/vinylidene fluoride terpolymer latex with a solids content of 50 wt. % obtained from 3M company under the trade designation "THV 340Z") were mixed in that order before addition of 50.0 g of "Glass Bubbles 1". The composition was shear mixed, slow-rolled, filtered, dried and rolled as in Comparative Example B. Compositions of the aqueous dispersions, the average wt % of dried fluoroplastic on the composite particles and the calculated fluoropolymer thickness are shown in Table 1. Fluoroplastic amount on the bubbles is expressed as weight percent based on the total weight of the composite particle and assumes that all available polymer was adsorbed onto the surface. This assumption was strengthened by the observation that in this example and in all others the dispersion changed from milky to transparent on filtering. Likewise, the calculated fluoropolymer thickness (Table 1) on the glass bubbles assumes all available polymer was adsorbed onto the bubbles.

TABLE 1

| EX | Glass Bubble Type | MIXTURE COMPOSITION, grams (g) | | | | | Wt % fluoropolymer expected on dry glass bubble (**calculated nm thickness) | (Wt % Total Water in dispersion. Added water + water from polymer emulsion) |
|---|---|---|---|---|---|---|---|---|
| | | Water | NMP | Surfactant | Fluoro polymer | Glass Bubble | | |
| 1 | 1 | 300 | 5.00 | 0.50 | 138.3 | 100 | 30.0 (237) | 73 |
| 2 | 1 | 1050 | 17.5 | 0.53 | 350.0 | 350 | 23.7 (171) | 73 |

TABLE 1-continued

| EX | Glass Bubble Type | MIXTURE COMPOSITION, grams (g) | | | | | Wt % fluoropolymer expected on dry glass bubble (**calculated nm thickness) | (Wt % Total Water in dispersion. Added water + water from polymer emulsion) |
|---|---|---|---|---|---|---|---|---|
| | | Water | NMP | Surfactant | Fluoro polymer | Glass Bubble | | |
| 3 | 1 | 53.2 | 9.13 | NONE | 184.5 | 500 | 10.3 (63) | 24 |
| 4 | 1 | 154 | 9.01 | NONE | 41.8 | 500 | 2.5 (14) | 26 |
| 5 | 1 | 150 | 9.35 | 0.43 | 35.2 | 500 | 2.1 (12) | 25 |
| 6 | 2 | 1050 | 17.5 | 0.54 | 385.0 | 350 | 25.4 (339) | 73 |
| IE 7 | 1 | 150 | 2.5 | 0.25 | 30.0 | 50 | 23.1 (166) | 71 |
| IE 8 | 1 | 150 | 2.5 | 0.25 | 15.0 | 50 | 13.0 (83) | 72 |
| IE 9 | 1 | 150 | 0.94 | 0.043 | 3.6 | 60 | 2.9 (17) | 71 |
| IE 10 | 1 | 150 | 0.94 | 0.043 | 5.6 | 60 | 2.2 (13) | 70 |
| CEB | 1 | 300 | 5.00 | 0.05 | NONE | 100 | 0 (0) | 74 |

**Used for calculations: XLD6000 (average diameter = 20 microns, true density = 0.3), IM30K (average diameter = 18 microns, true density = 0.6), fluoropolymer density = 1.81 g/cc,

TABLE 2

Simulated Sea Water Corrosion (density in g/cc by week)

| Week | CE A | *EX 1 | EX 2 | EX 3 | EX 4 |
|---|---|---|---|---|---|
| 0 | 0.32 | 0.31 | 0.29 | 0.32 | 0.32 |
| 1 | 0.34 | **NT | 0.29 | 0.36 | 0.35 |
| 2 | 0.38 | 0.33 | 0.34 | 0.38 | 0.39 |
| 3 | 0.41 | 0.32 | 0.39 | 0.42 | 0.40 |
| 4 | 0.39 | 0.33 | 0.37 | 0.41 | 0.40 |
| 5 | 0.42 | 0.35 | 0.39 | 0.41 | 0.43 |
| 6 | 0.39 | 0.35 | 0.40 | 0.42 | 0.44 |
| 7 | 0.51 | 0.34 | 0.37 | 0.42 | 0.42 |
| 8 | 0.57 | 0.35 | 0.36 | 0.40 | 0.45 |
| 9 | 0.60 | NT | 0.38 | 0.44 | 0.46 |
| 10 | 0.84 | NT | 0.39 | 0.45 | 0.47 |
| 11 | 0.69 | NT | 0.39 | 0.45 | 0.46 |
| 12 | 0.72 | NT | 0.39 | 0.42 | 0.49 |

TABLE 3

Water Adsorption/Hydrophobicity (Water contact angles in degrees)

| Example | Time (secs) | | | | | | | | | | | | | |
|---|---|---|---|---|---|---|---|---|---|---|---|---|---|---|
| | 3 | 6 | 9 | 21 | 30 | 42 | 51 | 60 | 72 | 81 | 90 | 120 | 150 | 180 |
| CE A | 50 | 45 | 43 | 38 | 33 | 25 | 24 | 24 | 20 | 20 | 20 | 20 | 20 | 20 |
| CE B | 49 | 46 | 44 | 37 | 32 | 26 | 24 | 23 | 23 | 21 | 20 | 20 | 20 | 20 |
| EX2 | 100 | 97 | 96 | 93 | 92 | 91 | 90 | 89 | 88 | 87 | 86 | 84 | 82 | 81 |
| EX3 | 94 | 92 | 90 | 83 | 81 | 80 | 79 | 78 | 77 | 76 | 75 | 74 | 72 | 70 |
| EX4 | 101 | 100 | 99 | 96 | 94 | 93 | 91 | 90 | 89 | 89 | 88 | 86 | 85 | 84 |
| EX5 | 94 | 91 | 89 | 84 | 84 | 82 | 81 | 80 | 79 | 78 | 77 | 76 | 75 | 74 |
| EX7 | 92 | 92 | 92 | 91 | 91 | 90 | 90 | 90 | 90 | 89 | 89 | 87 | 87 | 86 |
| EX8 | 103 | 103 | 103 | 100 | 99 | 98 | 98 | 97 | 97 | 96 | 96 | 94 | 93 | 92 |
| EX9 | 74 | 73 | 72 | 69 | 67 | 66 | 65 | 64 | 63 | 62 | 61 | 59 | 58 | 56 |
| EX10 | 69 | 69 | 69 | 68 | 68 | 67 | 66 | 66 | 65 | 65 | 65 | 63 | 61 | 60 |

Bubbles 1". The composition was shear mixed, slow-rolled, filtered, dried and rolled as in Comparative Example B. Compositions of the aqueous dispersions, the average wt % of dried fluoroplastic on the composite particles and the calculated fluoroplastic thickness are shown in Table 1. Fluoroplastic amount on the bubbles is expressed as weight percent based on the total weight of the composite particle and assumes that all available polymer was adsorbed onto the surface. This assumption was strengthened by the observation that in this example and in all others the dispersion changed from milky to transparent on filtering. Likewise, the calculated fluoroplastic thickness (Table 1) on the glass bubbles assumes all available polymer was adsorbed onto the bubbles.

Illustrative Example 9

Composite particles comprising a hollow glass microsphere and a polymeric layer of fluoroplastic disposed on the hollow glass microsphere were prepared. Deionized water (150.0 grams (g)), 0.94 g of NMP, 0.043 g of fluorosurfactant (obtained from 3M Company, under the trade designation "FC-4430"), and 3.60 g of fluoroplastic (a tetrafluoroethylene/hexafluoropropylene/vinylidene fluoride terpolymer latex with a solids content of 50 wt. % obtained from 3M company under the trade designation "THV 340.") were mixed in that order before addition of 60.0 g of "Glass Illustrative Example 10

Composite particles comprising a hollow glass microsphere and a polymeric layer of fluoroplastic disposed on the hollow glass microsphere were prepared. Deionized water (150.0 grams (g)), 0.94 g of NMP, 0.043 g of fluorosurfactant (obtained from 3M Company, under the trade designation "FC-4430"), and 5.60 g of fluoroplastic obtained from 3M Company under the trade designation "TF5033GZ" were mixed in that order before addition of 60.0 g of "Glass Bubbles 1". The composition was shear mixed, slow-rolled, filtered, dried and rolled as in Comparative Example B.

Compositions of the aqueous dispersions, the average wt % of dried fluoroplastic on the composite particles and the calculated fluoroplastic thickness are shown in Table 1. Fluoroplastic amount on the bubbles is expressed as weight percent based on the total weight of the composite particle and assumes that all available polymer was adsorbed onto the surface. This assumption was strengthened by the observation that in this example and in all others the dispersion changed from milky to transparent on filtering. Likewise, the calculated fluoroplastic thickness (Table 1) on the glass bubbles assumes all available polymer was adsorbed onto the bubbles.

Examples 9 and 10 were evaluated for Water Adsorption/ Hydrophobicity and Simulated Sea Damage using the test methods described above. The results are shown in Table 3, above, and Table 4, below, respectively.

TABLE 4

Simulated Sea Water Corrosion (density in g/cc by week)

| Week | 0 | 2 | 4 | 6 | 8 | 10 | 12 | 14 | 16 | 18 | 20 | 22 | 24 |
|---|---|---|---|---|---|---|---|---|---|---|---|---|---|
| IE 9 | 0.32 | 0.37 | 0.38 | 0.37 | 0.40 | 0.43 | 0.53 | 0.62 | 0.64 | 0.63 | 0.82 | 0.70 | 0.78 |
| IE 10 | 0.32 | 0.37 | 0.37 | 0.38 | 0.40 | 0.43 | 0.40 | 0.42 | 0.42 | 0.41 | 0.47 | 0.42 | 0.44 |

All patents and publications referred to herein are hereby incorporated by reference in their entirety. All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A composite particle comprising:
   a discrete, hollow, ceramic spheroid, and
   a layer of amorphous fluoropolymer disposed on the discrete, hollow, ceramic spheroid, wherein the amorphous fluoropolymer is an amorphous homopolymer or copolymer of a perfluoroalkyl vinyl ether; a perfluoroalkoxyalkyl vinyl ether; at least one fluoroolefin independently represented by formula $C(R)_2=CF-Rf$, wherein Rf is fluorine or a perfluoroalkyl having from 1 to 8 carbon atoms and R is hydrogen, fluorine, or chlorine; or a combination thereof.

2. The composite particle of claim 1, wherein the amorphous fluoropolymer is a copolymer of vinylidene fluoride and hexafluoropropylene; a copolymer of vinylidene fluoride, hexafluoropropylene, and tetrafluoroethylene; a copolymer of vinylidene fluoride, hexafluoropropylene, tetrafluoroethylene, and perfluoromethylvinyl ether; a copolymer of vinylidene fluoride, propylene, and tetrafluoroethylene; or a copolymer of vinylidene fluoride, hexafluoropropylene, tetrafluoroethylene, perfluoromethylvinyl ether, and ethylene.

3. The composite particle of claim 1, wherein the amorphous fluoropolymer is a copolymer of vinylidene fluoride and hexafluoropropylene or a copolymer of vinylidene fluoride, hexafluoropropylene, and tetrafluoroethylene.

4. The composite particle of claim 1, wherein the amorphous fluoropolymer is not crosslinked.

5. The composite particle of claim 1, wherein the composite particle comprises at least 75 percent by weight of ceramic, based on the total weight of the composite particle.

6. The composite particle of claim 1, wherein the composite particle comprises up to 30 percent by weight of the amorphous fluoropolymer, based on the total weight of the composite particle.

7. The composite particle of claim 1, wherein the composite particle comprises less than 3 percent by weight of the amorphous fluoropolymer, based on the total weight of the composite particle.

8. The composite particle claim 1, wherein the discrete, hollow, ceramic spheroid comprises glass.

9. The composite particle of claim 1, wherein the layer of amorphous fluoropolymer has a thickness of up to 300 nanometers.

10. The composite particle of claim 1, wherein the discrete, hollow, ceramic spheroid has a maximum dimension of up to one millimeter.

11. The composite particle of claim 1, wherein the amorphous fluoropolymer is crosslinked.

12. The composite particle of claim 1, wherein the composite particle comprises at least 97.5 percent by weight of ceramic, based on the total weight of the composite particle.

13. The composite particle of claim 1, wherein the amorphous fluoropolymer has a weight average molecular weight in a range from 10,000 grams per mole to 200,000 grams per mole.

14. A composite material comprising a plurality of the composite particles of claim 1 dispersed in a matrix material.

15. The composite material of claim 14, wherein the matrix material does not comprise a fluorinated polymer.

16. The composite material of claim 14, wherein the matrix material comprises at least one of polyethylene, polypropylene, silicone rubber, polystyrene, epoxy, or phenolic.

17. A conduit having a layer of the composite material of claim 14 disposed on an outer surface thereof.

18. A plurality of the composite particles of claim 1.

19. The plurality of composite particles of claim 18, wherein the plurality of particles is free-flowing.

20. A method of making a plurality of the composite particles of claim 1, the method comprising:
   providing a dispersion comprising a continuous aqueous phase and a dispersed phase comprising an amorphous fluoropolymer;
   combining the dispersion with a plurality of hollow, ceramic spheroids such that a layer of amorphous fluoropolymer is disposed on at least a portion of each hollow, ceramic spheroid to form the composite particles, wherein each one of the composite particles contains a discrete, hollow, ceramic spheroid; and
   separating the composite particles from the continuous aqueous phase.

* * * * *

UNITED STATES PATENT AND TRADEMARK OFFICE
CERTIFICATE OF CORRECTION

PATENT NO. : 9,815,969 B2  
APPLICATION NO. : 14/654137  
DATED : November 14, 2017  
INVENTOR(S) : Stephen Amos et al.

Page 1 of 2

It is certified that error appears in the above-identified patent and that said Letters Patent is hereby corrected as shown below:

On the Title Page

Column 2 item (57), (Abstract)
Line 5, delete "fTuorookfe" and insert -- fluoroolefin --, therefor.

In the Specification

Column 7
Line 34-35, delete "$[R_f\text{—O-L-COO}^-]_1X^{1+}$" and insert -- $[R_f\text{—O-L-COO}^-]_iX^{i+}$ --, therefor.
Line 40, delete "$X^{1+}$" and insert -- $X^{i+}$ --, therefor.

Column 10
Line 56, delete "percent" and insert -- percent, --, therefor.

Column 15
Line 54, delete "Mpa" and insert -- MPa --, therefor.

Column 21
Line 33, delete "(VP2/HFP)" and insert -- (VF2/HFP) --, therefor.

Column 22
Line 1, delete "% VDF" and insert -- /VDF --, therefor.

Column 23
Line 23, delete "(PAPENMAIER" and insert -- (PAPENMEIER --, therefor.

Column 25
Line 66, delete "340.")" and insert -- 340Z") --, therefor.

Signed and Sealed this  
Tenth Day of May, 2022

Katherine Kelly Vidal  
*Director of the United States Patent and Trademark Office*

In the Claims

Column 28
Line 9, in Claim 8, after "particle" insert -- of --.